United States Patent
Hayashi et al.

(10) Patent No.: US 7,068,296 B2
(45) Date of Patent: Jun. 27, 2006

(54) OPTICAL SCANNING DEVICE FOR REDUCING A DOT POSITION DISPLACEMENT AT A JOINT OF SCANNING LINES

(75) Inventors: Yoshinori Hayashi, Kanagawa (JP); Tomohiro Nakajima, Tokyo (JP); Mitsumi Fujii, Iwate (JP); Yukito Satoh, Miyagi (JP); Eiji Mochizuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 194 days.

(21) Appl. No.: 10/242,710

(22) Filed: Sep. 13, 2002

(65) Prior Publication Data

US 2003/0072066 A1  Apr. 17, 2003

(30) Foreign Application Priority Data

Sep. 14, 2001  (JP) ........................... 2001-279420
Sep. 26, 2001  (JP) ........................... 2001-293179
Oct. 25, 2001  (JP) ........................... 2001-327317

(51) Int. Cl.
*B41J 27/00*  (2006.01)

(52) U.S. Cl. ........................... 347/243; 347/260
(58) Field of Classification Search ................ 347/243, 347/259–261, 234, 235, 248, 250, 239, 255, 347/134; 359/212–214, 224–225, 198, 201; 331/46, 48, 178; 346/107.3, 107.4; 351/209; 385/7
See application file for complete search history.

(56) References Cited

U.S. PATENT DOCUMENTS 4,450,458 A * 5/1984 Araghi et al. ............ 347/134
4,940,304 A * 7/1990 Hatori ......................... 385/7
5,629,790 A * 5/1997 Neukermans et al. ....... 359/198
5,654,817 A * 8/1997 De Loor ..................... 359/201

(Continued)

FOREIGN PATENT DOCUMENTS

| JP | 8-75475 | 3/1996 |
|---|---|---|
| JP | 10-244708 | 9/1998 |
| JP | 11-95152 | 4/1999 |

OTHER PUBLICATIONS

U.S. Appl. No. 11/102,658, filed Apr. 11, 2005, Fujii et al.
U.S. Appl. No. 11/074,785, filed Mar. 9, 2005, Mochizuki.
U.S. Appl. No. 11/082,765, filed Mar. 18, 2005, Sato.
U.S. Appl. No. 10/242,710, filed Sep. 13, 2002, Hayashi et al.
U.S. Appl. No. 10/803,991, filed Mar. 19, 2004, Nakajima et al.
U.S. Appl. No. 10/787,095, filed Feb. 27, 2004, Hayashi et al.
U.S. Appl. No. 10/820,733, filed Apr. 9, 2004, Suhara et al.
U.S. Appl. No. 10/878,365, filed Jun. 29, 2004, Nakajima.
U.S. Appl. No. 10/866,043, filed Jun. 14, 2004, Hayashi et al.

(Continued)

*Primary Examiner*—Hai Pham
(74) *Attorney, Agent, or Firm*—Oblon, Spivak, McClelland, Maier & Neustadt, P.C.

(57) ABSTRACT

In this optical scanning device, a plurality of scanning optical systems are arranged in a main scanning direction. Each of the scanning optical systems includes a deflecting unit performing an optical scanning by oscillation. Scanning frequencies of the deflecting units are substantially equal to one another. Each of the deflecting units is provided with means for varying the scanning frequency. The scanning frequency of each of the deflecting units is set midway between a maximum value and a minimum value of a resonance frequency intrinsic to the deflecting unit.

12 Claims, 27 Drawing Sheets

U.S. PATENT DOCUMENTS

| | | | |
|---|---|---|---|
| 6,097,418 A * | 8/2000 | Larsen et al. | 347/235 |
| 6,185,026 B1 | 2/2001 | Hayashi et al. | 359/204 |
| 6,198,562 B1 | 3/2001 | Hayashi et al. | 359/204 |
| 6,317,246 B1 | 11/2001 | Hayashi et al. | 359/204 |
| 6,352,344 B1 * | 3/2002 | Tidwell | 351/209 |
| 6,400,391 B1 | 6/2002 | Suhara et al. | 347/244 |
| 6,400,917 B1 | 6/2002 | Nakazato et al. | 399/111 |
| 6,462,853 B1 | 10/2002 | Hayashi | 359/205 |
| 6,485,126 B1 | 11/2002 | Kato et al. | 347/54 |
| 6,497,474 B1 | 12/2002 | Irinoda et al. | 347/54 |
| 6,573,921 B1 | 6/2003 | Hayashi | 347/131 |
| 6,587,245 B1 | 7/2003 | Hayashi | 359/204 |
| 6,621,512 B1 | 9/2003 | Nakajima et al. | 347/245 |
| 6,657,765 B1 | 12/2003 | Hayashi et al. | 359/225 |

OTHER PUBLICATIONS

U.S. Appl. No. 10/837,489, filed May 3, 2004, Fujii et al.
U.S. Appl. No. 10/127,768, filed Apr. 23, 2002, Pending.
U.S. Appl. No. 09/538,508, Mar. 30, 2000, Pending.
U.S. Appl. No. 09/552,657, filed Apr. 19, 2000, Pending.
U.S. Appl. No. 09/765,608, filed Jan. 22, 2001, Pending.
U.S. Appl. No. 09/769,510, filed Jan. 26, 2001, Pending.
U.S. Appl. No. 10/143,013, filed May 13, 2002, Pending.

* cited by examiner

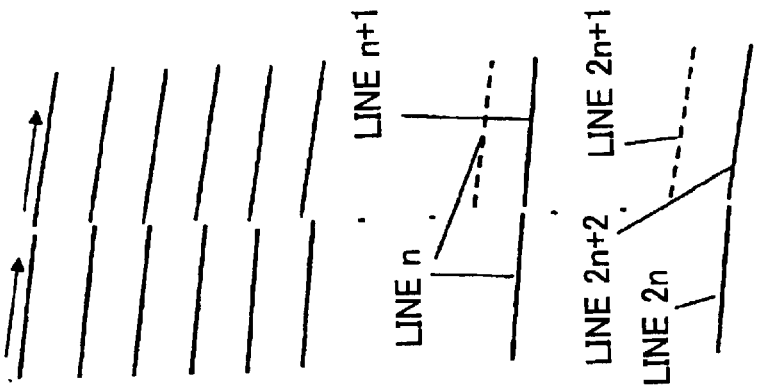
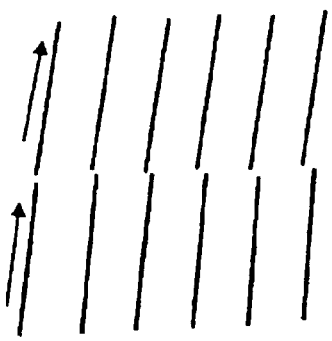
FIG. 7A COMPARATIVE EXAMPLE
FIG. 7B EMBODIMENT
MOVING DIRECTION OF PHOTOSENSITIVE MEMBER (SUB-SCANNING DIRECTION)

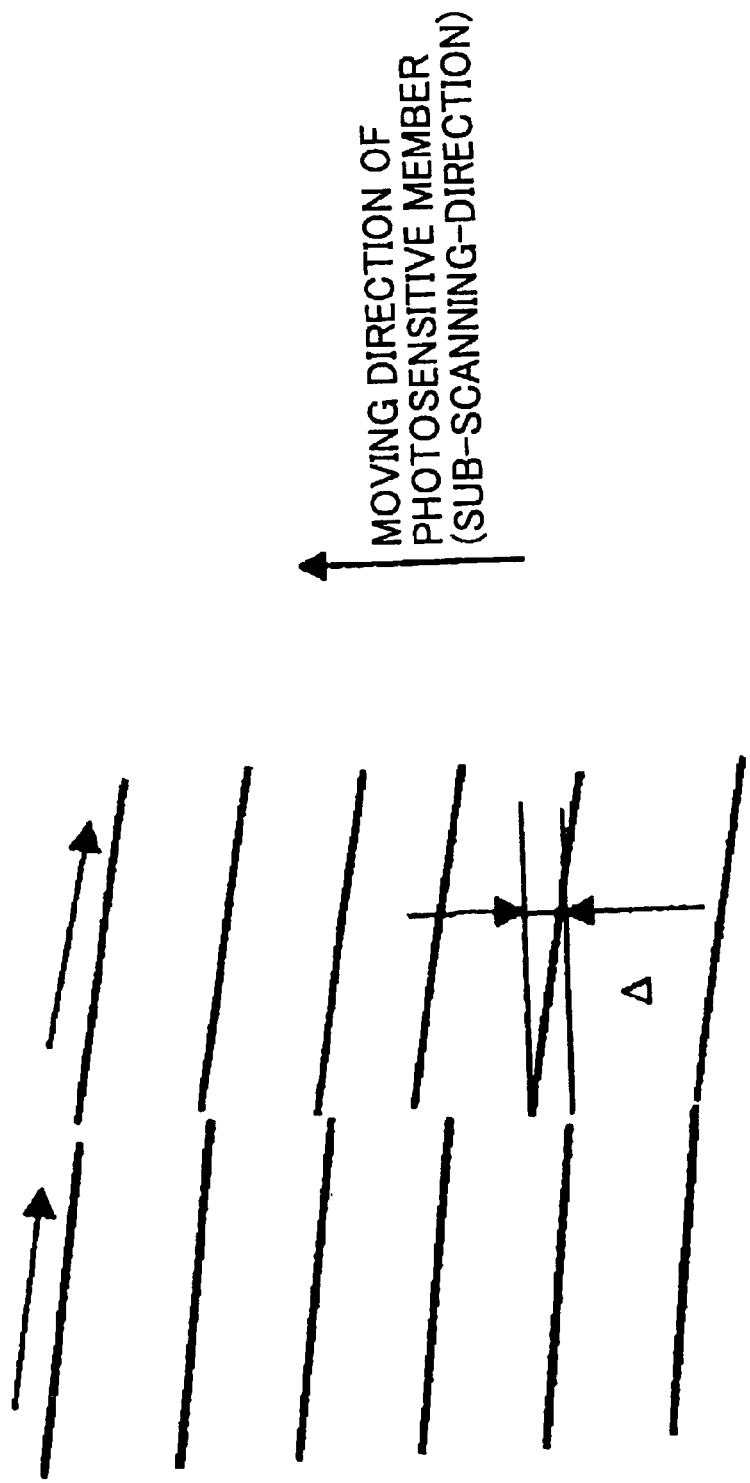

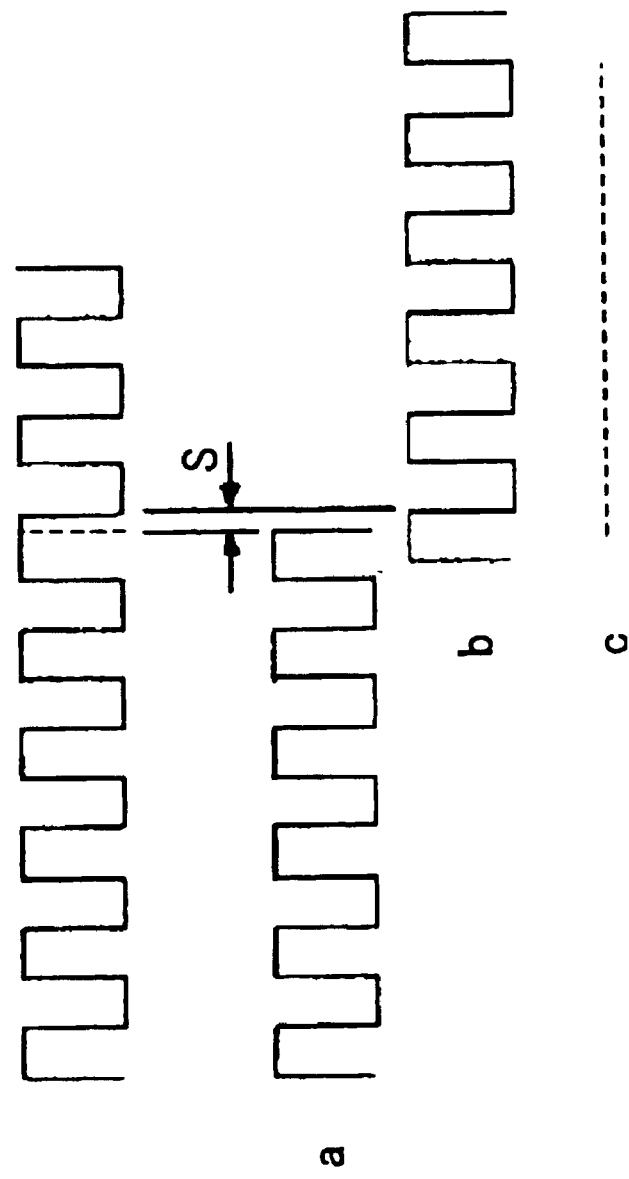

MAIN SCANNING SECTION

SUB-SCANNING SECTION

DUMMY MIRROR

MAGNIFICATION

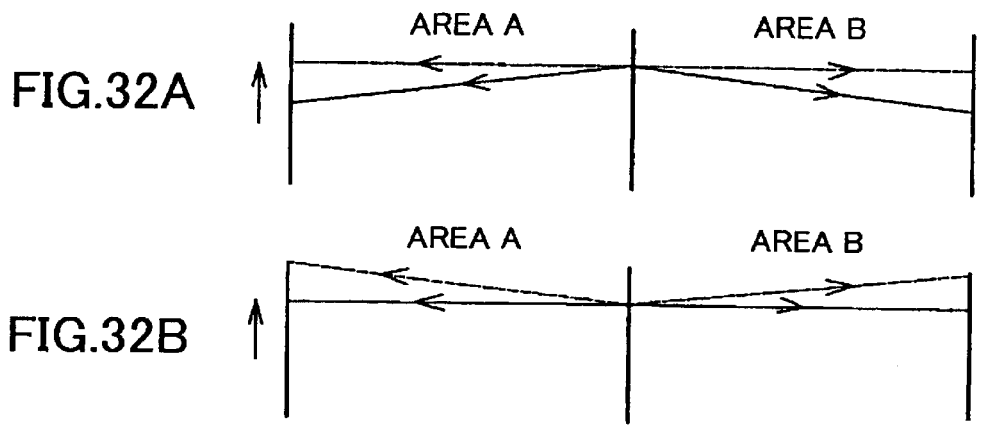
FIG.32A
FIG.32B
FIG.33
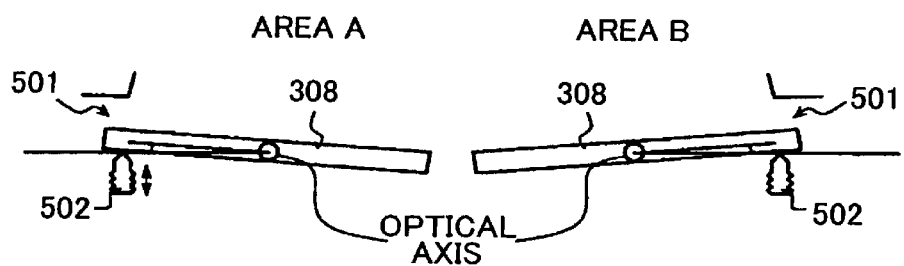

OPTICAL SCANNING DEVICE FOR REDUCING A DOT POSITION DISPLACEMENT AT A JOINT OF SCANNING LINES

BACKGROUND OF THE INVENTION

1. Field of the Invention

The present invention generally relates to an optical scanning device and an image forming apparatus, and more particularly, to an optical scanning device including a plurality of scanning optical systems (optical scanners) each deflecting a light beam by oscillating a micro mirror, and an image forming apparatus, which are used in a laser beam printer, a digital plain-paper copying machine, a plain-paper facsimile and so forth.

2. Background of the Invention

Some of color laser beam printers, color copying machines, color facsimiles and so forth are each provided with a plurality of scanning optical systems for the purpose of increasing a rate of image writing or image forming. The invention described in Japanese Laid-Open Patent Application No 10-244708 is one of examples thereof, in which a plurality of scanning optical systems are provided, each of which performs an optical scanning by using a polygon scanner. Additionally, there is also provided a synchronous revolution controlling means for adjusting a revolving speed of each of polygon motors.

Besides, as a new type of optical scanning device, an optical scanning device comprising a deflecting unit performing an optical scanning by oscillation is being studied. This deflecting unit uses a sine-wave oscillation. Additionally, another optical scanning device is being studied in which a mechanical resonance frequency of the deflecting unit is variable.

An optical scanning device deflecting a pencil by a deflector utilizing reflection, and using the deflected pencil for scanning, is well known conventionally. A polygon scanner using a polygon mirror revolving at a constant speed is widely used as the deflector. However, since the polygon scanner makes a scale of the device large, there are problems, such as a banding due to vibration, a temperature rise, noises, and increased power consumption.

Also, an optical scanning device of another type is known, in which a plurality of scanning optical systems are arranged in parallel in a main scanning direction. This type provides advantages as follows:

A compact optical scanning device capable of scanning a wide scan area.

Small-size scanning optical systems and scanning optical elements which facilitates a correction of wave aberration: this reduces a variation of a beam spot diameter due to component variations or errors in mounting components; thus, it becomes easy to reduce a beam spot diameter.

Also, it is known that a plurality of scanning optical systems are arranged in a sub-scanning direction so as to be applied in a multicolor image forming apparatus.

On the other hand, there is proposed a micro mirror that is provided with a resonance structure by using a micromachining technology, and is caused to oscillate in a sine-wave form so as to deflect a light. Using this micro mirror reduces a scale of a device as a whole, and largely alleviates the above-mentioned problems, such as a banding due to vibration, a temperature rise, noises, and increased power consumption.

However, a scanning frequency of the micro mirror oscillating in the sine-wave form depends on an intrinsic resonance frequency which may become a different value due to manufacture variation.

When scanning optical systems have different resonance frequencies, positions of scanning lines become different for each of the scanning optical systems. Thus, when a plurality of scanning optical systems are arranged in a main scanning direction, a dot position displacement occurs in a sub-scanning direction at a joint of scanning lines joined in the main scanning direction. Besides, when a plurality of scanning optical systems are arranged in the sub-scanning direction, a color displacement occurs in the sub-scanning direction.

Besides, a recent optical scanning device scanning with a light beam, such as a laser light, is used in an optical apparatus, such as a barcode reader, a laser printer, or a head mount display. As an optical scanning device of this type, there is proposed an optical scanner that oscillates a micro mirror utilizing a micromachining technology, as mentioned above.

FIG. 1A is a perspective view of an optical scanner used in a conventional optical scanning device. FIG. 1B is a sectional view of the optical scanner shown in FIG. 1A. This optical scanner comprises a mirror 1 supported by a rotary axis composed of two elastic members 3 as beams arranged in a line, a moving electrode 26 provided on the mirror 1, and a stationary electrode 25 provided on a stationary member 5 so as to oppose the moving electrode 26. The mirror 1 is oscillated back and forth by an electrostatic suction force generated between the moving electrode 26 and the stationary electrode 25, with the two elastic members 3 functioning as a twisting axis.

In the above-described optical scanner, a resonance frequency f0 of the mirror 1 is generally obtained by the following expression.

$$f0 = \tfrac{1}{2}\pi\sqrt{(K\theta/I)} \qquad \text{(Expression 1)}$$

In this expression, I represents a moment of inertia of the mirror, and $K\theta$ represents a spring constant determined by the two elastic members 3.

At this point, precisions of the elastic members 3 vary through a manufacturing process thereof. Accordingly, $K\theta$ varies. Therefore, the resonance frequency f0 represented by the expression 1 also varies.

In an optical scanning device including a plurality of the optical scanners, when the resonance frequency f0 of the mirror 1 varies among the optical scanners, an oscillation angle θ of the mirror 1 shown in FIG. 1B varies, as a result of which a joint of images formed by one optical scanner and an adjacent optical scanner becomes visible, causing a problem of a deterioration of image quality.

Besides, for the purpose of solving the above-mentioned problems, such as a banding due to vibration, a temperature rise, noises, and increased power consumption, there is proposed a micro mirror that is provided with a resonance structure by using a micromachining technology, and is caused to oscillate in a sine-wave form, as mentioned above. Using this micro mirror reduces a scale of a device as a whole, and largely alleviates the above-mentioned problems.

However, the above-mentioned micro mirror moves alternately back and forth; thus, when a writing light beam is reciprocated in scanning, there is an inconvenience that scanning lines formed on a scanned surface come to have different intervals in height because the scanned surface moves in a sub-scanning direction while the beam is moved in a main scanning direction. This may cause image inferiorities, such as a density irregularity. Further, it is conventionally difficult to adjust a resonance characteristic of the micro mirror device.

To solve these problems, Japanese Laid-Open Patent Application No. 8-75475 discloses an optical scanning device using a deflector utilizing a resonance. This invention, which is intended to facilitate an adjustment of a resonance characteristic of a resonator used in the deflector, is a "resonator comprising an oscillation input part, a moving part, and an elastic deforming part having at least one resonant oscillation mode and coupling said oscillation input part and said moving part, characterized by including resonance characteristic adjusting means for adjusting a resonance characteristic" (claim 1 of the invention disclosed in Japanese Laid-Open Patent Application No. 8-75475).

However, according to the invention disclosed in Japanese Laid-Open Patent Application No. 8-75475, the resonance characteristic adjusting means is realized by separating a mass adjustment part by melting, which is unable to adjust the resonance characteristic effectively enough for an optical scanning device that requires a delicate and subtle adjustment.

Additionally, it is known that a plurality of scanning optical systems are serially arranged in a main scanning direction so as to compose a compact optical scanning device that can scan a wide scan area, and scanning optical systems and scanning optical elements are made small so as to facilitate a correction of wave aberration, which also reduces a variation of a beam spot diameter due to component variations or errors in mounting components; this arrangement certainly makes it easy to reduce a beam spot diameter.

Therefor, Japanese Laid-Open Patent Application No. 11-95152 discloses an invention in which two scanning optical systems are serially arranged in a main scanning direction, and beams are caused to scan in respective directions parting from a joint of the two scanning optical systems.

However, when further reducing the size of an optical scanning device, simply arranging two scanning optical systems serially faces a limitation. Additionally, when an optical scanning device comprises a plurality of scanning optical systems, image deterioration is likely to occur because dots are displaced relatively in the vicinity of a joint of formed image areas. Further, when a writing light beam is reciprocated in scanning, there has been an inconvenience that the dot position displacement becomes large at the joint. Especially, when three scanning optical systems or more are serially arranged in a main scanning direction, this arrangement requires a further contrivance to avoid such dot position displacement.

SUMMARY OF THE INVENTION

It is a general object of the present invention to provide an improved and useful optical scanning device and an image forming apparatus in which the above-mentioned problems are eliminated.

A more specific object of the present invention is to provide an optical scanning device and an image forming apparatus using the optical scanning device having a plurality of scanning optical systems each of which includes a deflecting unit performing an optical scanning by oscillation, in which a dot position displacement or a color displacement in a sub-scanning direction at a joint of scanning lines is alleviated so as to form a high-quality image.

Another specific object of the present invention is to provide an optical scanning device including an optical scanner adjusting a variation of a resonance frequency of a mirror originating from a variation of a processing precision of a member so as to make an oscillation angle of the mirror constant, and further to provide an image forming apparatus comprising the optical scanning device so as to form a high-quality image.

Still another specific object of the present invention is to provide an optical scanning device and an image forming apparatus using the optical scanning device which can be made small by comprising a plurality of scanning optical systems, and can form a high-quality image by effectively correcting beams emitted from the scanning optical systems on an image bearer.

In order to achieve the above-mentioned objects, there is provided according to one aspect of the present invention an optical scanning device comprising a plurality of scanning optical systems including a plurality of respective deflecting units each performing an optical scanning by oscillation, wherein the deflecting units have substantially equal scanning frequencies.

According to the present invention, the deflecting units are made to have substantially equal scanning frequencies so as to alleviate a dot position displacement or a color displacement in a sub-scanning direction. Additionally, using a sine-wave oscillation mirror for each of the deflecting units reduces a banding due to vibration, a temperature rise, noises, and power consumption. Thus, the optical scanning device becomes eco-friendly, or less harming to environment.

Additionally, in the optical scanning device according to the present invention, each of the deflecting units may comprise frequency varying means for varying the scanning frequency.

According to the present invention, a dot position displacement or a color displacement in a sub-scanning direction can be alleviated.

Additionally, in the optical scanning device according to the present invention, the scanning frequency of each of the deflecting units may be set midway between a maximum value and a minimum value of a resonance frequency intrinsic to the deflecting unit.

According to the present invention, a dynamic range for adjusting the frequencies is narrowed so that the frequencies can be adjusted more precisely. Accordingly, a dot position displacement or a color displacement in a sub-scanning direction can be alleviated.

In order to achieve the above-mentioned objects, there is also provided according to another aspect of the present invention an optical scanning device comprising a plurality of scanning optical systems including a plurality of respective deflecting units each performing an optical scanning by oscillation, wherein a timing for performing an image recording is changed with respect to at least one of the scanning optical systems every predetermined number of scanning periods.

According to the present invention, a dot position displacement or a color displacement in a sub-scanning direction can be alleviated without adjusting the scanning frequencies.

Additionally, in the optical scanning device according to the present invention, the image recording may be not performed during a predetermined interval.

According to the present invention, there is provided an interval during which no image recording is performed. This enables an alleviation of a dot position displacement or a color displacement in a sub-scanning direction.

In order to achieve the above-mentioned objects, there is also provided according to another aspect of the present invention an image forming apparatus comprising the above-mentioned optical scanning device, wherein the scanning optical systems are arranged in a main scanning direction so that respective scanning areas of the scanning optical systems are combined so as to form an image.

According to the present invention, an image can be formed with a small dot position displacement.

In order to achieve the above-mentioned objects, there is also provided according to another aspect of the present invention an optical scanning device comprising a light source emitting a light, an optical scanner including a frame substrate, a stationary member, and a mirror supported by a mirror substrate via an elastic member so as to deflect the light emitted from the light source by oscillating the mirror back and forth on a twisting axis formed by the elastic member, and resonance-frequency adjusting means for adjusting an intrinsic resonance frequency determined by the mirror and the elastic member forming the twisting axis.

According to the present invention, a variation of the resonance frequency of the mirror originating from a variation of a processing precision of the elastic member so as to make an oscillation angle of the mirror constant.

Additionally, the optical scanning device according to the present invention may further comprise frequency varying means, wherein the mirror may include a moving electrode on a side surface thereof, the stationary member opposing the moving electrode may include a stationary electrode, and the frequency varying means may vary a frequency of a voltage impressed to the moving electrode and the stationary electrode, according to the resonance frequency adjusted by the resonance-frequency adjusting means.

Additionally, the optical scanning device according to the present invention may further comprise voltage adjusting means for adjusting the voltage impressed to the moving electrode and the stationary electrode.

According to the present invention, the frequency of the impressed voltage can be equated with the resonance frequency of the mirror so that the mirror oscillates resonantly with a large oscillation angle, which can also be fine-tuned with ease.

In order to achieve the above-mentioned objects, there is also provided according to another aspect of the present invention an image forming apparatus comprising the above-mentioned optical scanning device including one optical scanner or more, a photosensitive member on which an electrostatic latent image is formed by the optical scanning device, a developing unit developing the electrostatic latent image with a toner into a toner image, and a transferring unit transferring the toner image to a sheet.

According to the present invention, the oscillation angle of the mirror can be prevented from varying among the adjacent optical scanners so as to form a high-quality image.

In order to achieve the above-mentioned objects, there is also provided according to another aspect of the present invention an optical scanning device comprising a plurality of scanning optical systems including respective light sources emitting respective light beams controlled according to image data, and respective deflecting units deflecting the emitted respective light beams, and an image bearer on which the deflected light beams are projected so that images are formed by the projected light beams scanning on the image bearer, wherein each of the deflecting units is capable of moving alternately back and forth, the scanning optical systems are arranged serially in a main scanning direction of the image bearer, and each of the projected light beams scans on the image bearer unidirectionally in one main scanning direction.

According to the present invention, a plurality of the scanning optical systems and the deflecting units each capable of moving alternately back and forth are used so as to make the optical scanning device small. Additionally, each of the projected light beams scans unidirectionally in one main scanning direction so as to form a high-quality image. This reduces a deviation in image height among intervals of scanning lines formed on a scanned surface, and also reduces a dot position displacement in the vicinity of a joint of the scanning lines; thereby, a density irregularity can be alleviated so as to form a high-quality image with an increased resolution.

Additionally, in the optical scanning device according to the present invention, at least one pair of the adjacent scanning optical systems among the scanning optical systems may cause the projected light beams to scan on the image bearer in opposite main scanning directions parting from a joint of the respective images formed on the image bearer.

According to the present invention, a dot position displacement in the vicinity of the joint of the scanning lines can be further reduced, whereby a density irregularity can be further alleviated so as to form a high-quality image with an increased resolution.

In order to achieve the above-mentioned objects, there is also provided according to another aspect of the present invention an optical scanning device comprising more than two scanning optical systems including respective light sources emitting respective light beams controlled according to image data, and respective deflecting units deflecting the emitted respective light beams, and an image bearer on which the deflected light beams are projected so that images are formed by the projected light beams scanning on the image bearer, wherein the scanning optical systems are arranged serially in a main scanning direction of the image bearer, at least one pair of the adjacent scanning optical systems among the scanning optical systems cause the projected light beams to scan on the image bearer in opposite main scanning directions parting from a joint of the respective images formed on the image bearer, and no pair of the adjacent scanning optical systems among the scanning optical systems cause the projected light beams to scan on the image bearer in opposite main scanning directions both toward the joint of the respective images formed on the image bearer.

According to the present invention, a dot position displacement in the vicinity of the joint of the scanning lines can be surely reduced, whereby a density irregularity can be surely alleviated so as to form a high-quality image with an increased resolution.

In order to achieve the above-mentioned objects, there is also provided according to another aspect of the present invention an optical scanning device comprising a plurality of scanning optical systems including respective light sources emitting respective light beams controlled according to image data, and respective deflecting units deflecting the emitted respective light beams, and an image bearer on which the deflected light beams are projected so that images are formed by the projected light beams scanning on the image bearer, wherein the scanning optical systems are arranged serially in a main scanning direction of the image bearer, at least one pair of the adjacent scanning optical systems among the scanning optical systems cause the projected light beams to scan on the image bearer in opposite main scanning directions parting from a joint of the respective images formed on the image bearer, and main scanning lines drawn by the adjacent scanning optical systems have inclinations different from each other.

According to the present invention, not only a dot position displacement in the vicinity of the joint of the scanning lines can be reduced, but also curves and inclinations of the scanning lines can be alleviated so as to form a high-quality image.

Additionally, in the optical scanning device according to the present invention, at least one of the scanning optical systems may include adjusting means for adjusting the inclination of the main scanning line drawn by the adjacent scanning optical system.

According to the present invention, curves and inclinations of the main scanning lines, which result from the image bearer moving in a sub-scanning direction, can be reduced so as to form a high-quality image.

In order to achieve the above-mentioned objects, there is also provided according to another aspect of the present invention an image forming apparatus using at least one of the above-mentioned optical scanning.

According to the present invention, a high-quality image can be output with a small density irregularity and an increased resolution.

Other objects, features and advantages of the present invention will become more apparent from the following detailed description when read in conjunction with the accompanying drawings.

BRIEF DESCRIPTION OF THE DRAWINGS

FIG. 7A is a diagram illustrating a comparative example of joining scanning lines in a main scanning direction;

FIG. 7B is a diagram illustrating an example of joining scanning lines in a main scanning direction according to the second embodiment of the present invention;

FIG. 8 is a diagram illustrating scanning lines a displacement of which is corrected by changing a timing of an image recording in a different manner every predetermined number of scanning periods according to a third embodiment of the present invention;

FIG. 10A and FIG. 10B are timing charts of operations for changing a timing of an image recording every predetermined number of scanning periods;

FIG. 32A and FIG. 32B are diagrams symbolically illustrating scanning lines (depicted by solid lines) formed on a surface of a photosensitive member and scanning lines (depicted by dotted lines) scanned by an optical scanning device;

FIG. 33 is a plan view symbolically illustrating adjusting means for adjusting inclinations of main scanning lines.

DETAILED DESCRIPTION OF THE PREFERRED EMBODIMENTS

A description will now be given, with reference to the drawings, of embodiments of an optical scanning device and an image forming apparatus according to the present invention.

Figure 1A:
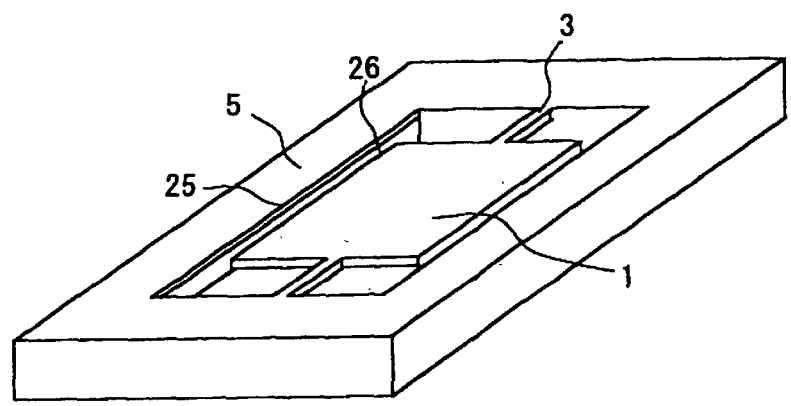
FIG. 1A is a perspective view of an optical scanner used in a conventional optical scanning device.
Figure 1B:
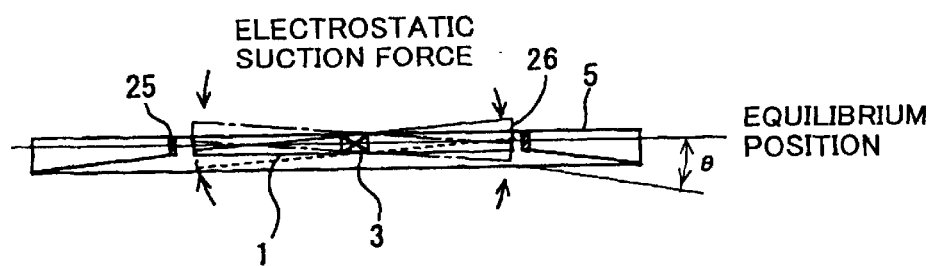
FIG. 1B is a sectional view of the optical scanner shown in FIG. 1A.
Figure 2:
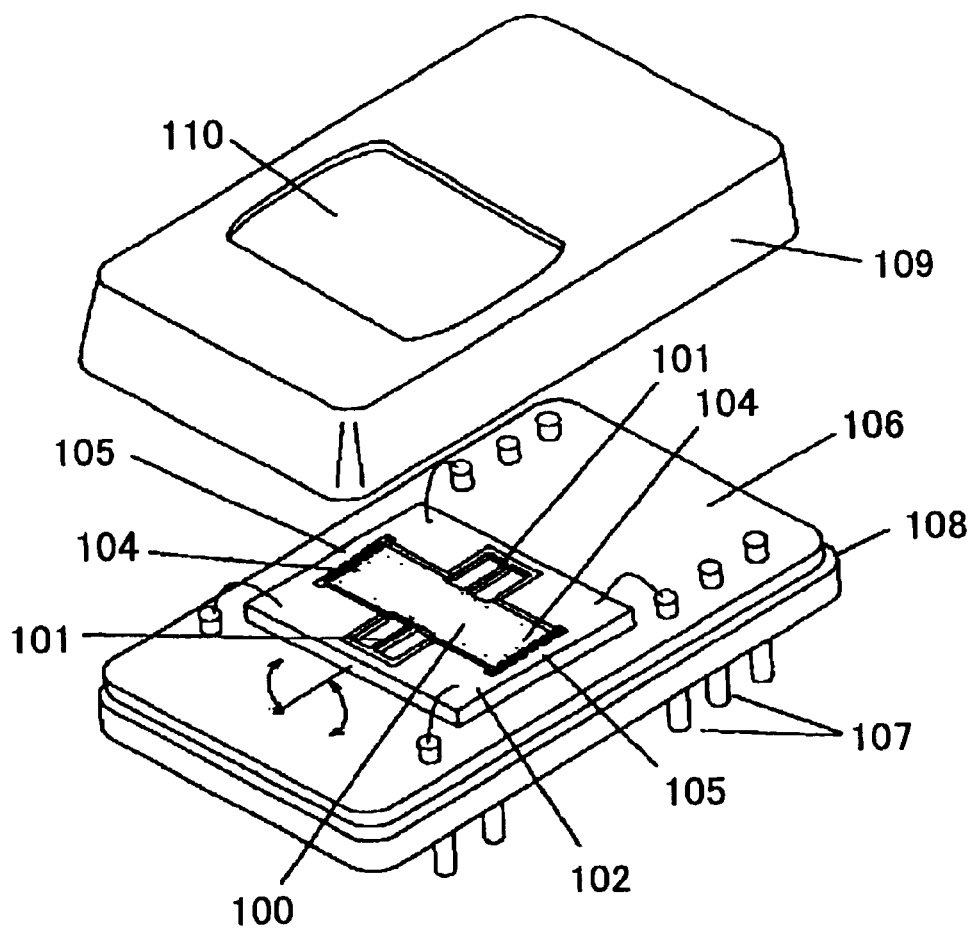
FIG. 2 is an exploded perspective view of a deflecting unit applicable in an optical scanning device according to the present invention.

FIG. 2 illustrates an oscillation mirror deflector used in an optical scanning device according to a first embodiment of the present invention. In FIG. 2, a mirror substrate is formed by etching a silicon substrate 102 so as to form a quadrilateral opening in a back surface thereof and to leave a frame portion and a top plate portion with a predetermined thickness. The top plate portion is formed by leaving an oscillation mirror 100 and torsion bars 101 as an axle bearing the oscillation mirror 100, and by penetrating the perimeter of the oscillation mirror 100 and the torsion bars 101. In the present embodiment, using a silicon substrate having a thickness of 200 μm, the oscillation mirror 100, i.e., the top plate portion, is formed 60 μm thick. The oscillation mirror 100 has a size of 4 mm×2 mm. The oscillation mirror 100 has an upper surface formed as a reflective surface by depositing a coating of metal, such as Cu (copper). The oscillation mirror 100 has projecting and receding parts in pectinate forms on both ends. These pectinate parts form moving electrodes 104.

Stationary electrodes 105 are formed on end surfaces of the substrate 102 opposite the moving electrodes 104 so that the stationary electrodes 105 engage the above-mentioned pectinate parts with a clearance of 5 μm. When the oscillation mirror 100 is in a horizontal position, the moving electrodes 104 and the stationary electrodes 105 oppose each other at a same position in regard to a thickness direction of the substrate 102. The size of the torsion bars 101 is determined according to a scanning frequency of the oscillation mirror 100 so that the oscillation mirror 100 resonates in an oscillation mode with the torsion bars 101 functioning as a rotary axis. In the present embodiment, the width of the torsion bars 101 is approximately 100 μm, and the length thereof is approximately 1 mm.

The silicon substrate 102 has a front surface forming a polished surface of a wafer, and has a nitride film used for insulating the electrodes and the substrate. Therefore, the oscillation mirror 100 etched by penetrating the perimeter thereof is inclined slightly due to a difference in internal stresses between the front and back surfaces. Thus, the moving electrodes 104 and the stationary electrodes 105 are different in level by several micrometers. Then, when a voltage is impressed to one of the stationary electrodes 105, the oscillation mirror 100 revolves to the horizontal position due to an electrostatic force with the torsion bars 101 being twisted. When an alternating current voltage is impressed, the oscillation mirror 100 oscillates back and forth. Although this oscillation is slight, equating the frequency of the impressed alternating current voltage to a mechanical resonance frequency intrinsic to the oscillation mirror 100 excites the oscillation mirror 100 so as to enlarge amplitude thereof. In the present embodiment, the oscillation mirror 100 is caused to oscillate in a sine-wave form by ±5°.

The moving electrodes 104 and the stationary electrodes 105 are provided with the pectinate forms so as to increase peripheral lengths thereof and thus increase areas of the electrodes. Accordingly, a large electrostatic torque can be obtained by impressing a low voltage.

By the way, a resonance frequency fd is generally obtained by the following expression.

$$fd=\sqrt{(K/J)}$$

In this expression, J represents a moment of inertia of an oscillation mirror, and K represents a spring constant of a torsion bar, where $$K=G \cdot I/L$$

G: Elastic coefficient, I: Geometrical moment of inertia, and L: Length

However, the resonance frequency of the oscillation mirror varies by approximately 2% due to process errors in the course of manufacturing steps and/or variations in sizes.

Figure 3:
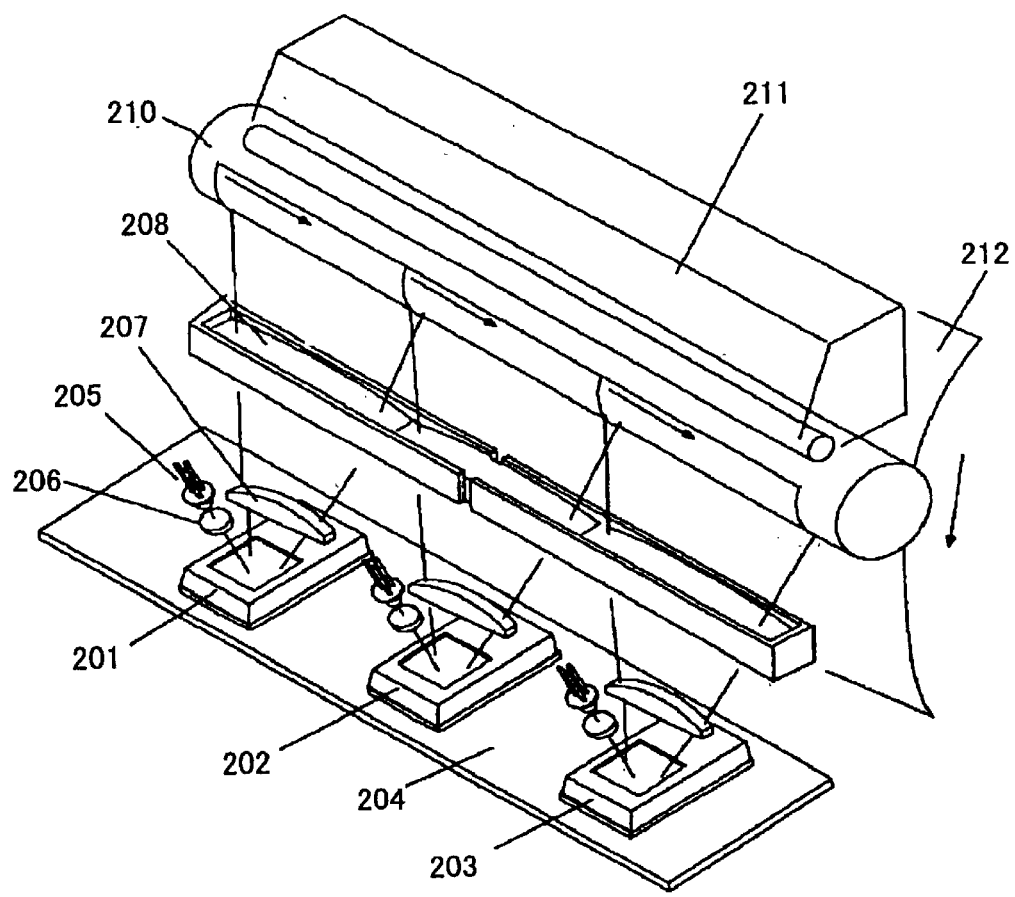
FIG. 3 is a perspective view of an image forming apparatus using an optical scanning device according to a first embodiment of the present invention.

FIG. 3 illustrates the optical scanning device according to the present embodiment. In FIG. 3, three oscillation mirror deflectors 201, 202 and 203 are arranged in a main scanning direction on an electrical substrate 204. The oscillation mirror deflectors 201, 202 and 203 are deflecting units each of which performs an optical scanning by oscillation. The oscillation mirror deflectors 201, 202 and 203 are combined with respective semiconductor lasers 205 as light sources, respective coupling lenses 206, respective first scanning lenses 207, and respective second scanning lenses 208 so as to form respective scanning optical systems. In the present embodiment, the second scanning lenses 208 are formed unitarily by being joined in a line in the main scanning direction.

A light beam emitted from the semiconductor laser 205 of each of the scanning optical systems becomes a parallel pencil through the coupling lens 206, and enters the oscillation mirror deflector. The light beam enters the oscillation mirror deflector with an inclination of approximately 20° from a normal of the oscillation mirror 100 in a sub-scanning direction, and is deflected by the oscillation mirror 100, and then is emitted from the oscillation mirror deflector. Further, the light beam is focused by the scanning lenses 207 and 208 onto an image bearer 210, which is formed by a photosensitive drum and so forth, so as to scan and expose each of areas divided from one image in the main scanning direction, to form an electrostatic latent image. The electrostatic latent images scanned and recorded by each of the scanning optical systems are combined in the main scanning direction into one electrostatic latent image; the electrostatic latent image is developed with a toner by a developing unit 211, and is transferred to a transfer sheet 212 as a toner image. The toner image on the transfer sheet 212 is fixed by a fixing unit (not shown in the figure). After the above-mentioned transferring process, the image bearer 210 undergoes a cleaning process, a discharging process, a charging process and so forth, and then again is subjected to the above-mentioned exposing process. Thus, a predetermined series of electrophotographic processes are performed.

When the resonance frequency of the oscillation mirror 100 varies by approximately 2% as mentioned above in the above-mentioned exposing process, a dot position is displaced in the sub-scanning direction at a joint of scanning lines. For instance, scanning 50 lines from a same starting position results in a displacement of more than one line.

Figure 4:
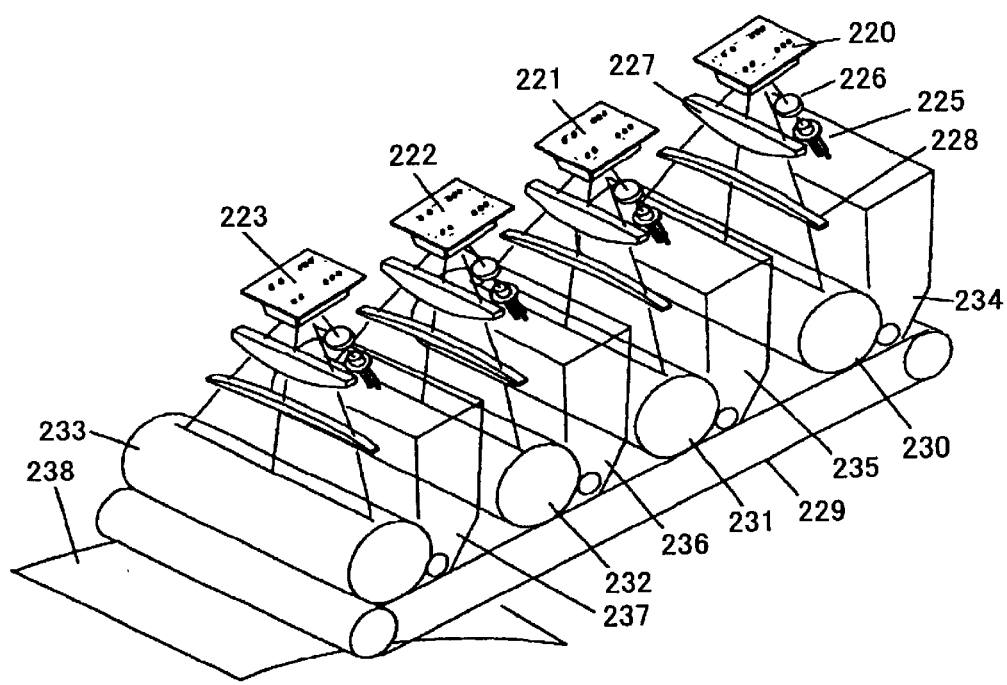
FIG. 4 is a perspective view of an image forming apparatus using an optical scanning device according to a second embodiment of the present invention.

FIG. 4 illustrates an optical scanning device according to a second embodiment of the present invention. In FIG. 4, four oscillation mirror deflectors 220, 221, 222 and 223 are arranged in parallel in a sub-scanning direction on an electrical substrate (not shown in the figure in the present embodiment). The oscillation mirror deflectors 220, 221, 222 and 223 are deflecting units each of which performs an optical scanning by oscillation. The oscillation mirror deflectors 220, 221, 222 and 223 are combined with respective semiconductor lasers 225, respective coupling lenses 226, respective first scanning lenses 227, and respective second scanning lenses 228 so as to form respective scanning optical systems. The scanning optical systems record electrostatic latent images corresponding to yellow (Y), magenta (M), cyan (C) and black (K), respectively, on image bearers 230, 231, 232 and 233, each of which is formed by a photosensitive drum and so forth, arranged along a feeding direction of a transfer belt 229. The electrostatic latent images are developed with toners of the respective colors into toner images by developing units 234, 235, 236 and 237.

The toner images formed on the image bearers 230, 231, 232 and 233 are transferred to the transfer belt 229 one by one as the transfer belt 229 moves so as to lay the images over one another to form a color image. The color image on the transfer belt 229 is transferred to a transfer sheet 238. The color image on the transfer sheet 238 is fixed by a fixing unit (not shown in the figure). The image bearers 230, 231, 232 and 233 undergo a cleaning process, a discharging process, a charging process and so forth, and then again is subjected to an exposing process so as to form electrostatic latent images thereon, as in the foregoing first embodiment.

Also in the present second embodiment, when the resonance frequency of the oscillation mirror 100 varies by approximately 2%, scanning 50 lines from a same starting position results in a color displacement of more than one line, as in the foregoing first embodiment.

Figure 5A:
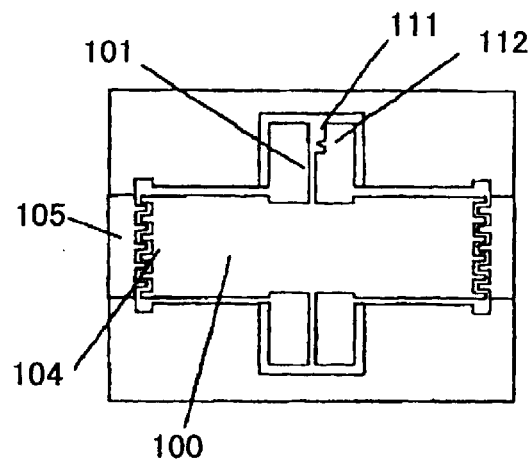
FIG. 5A to FIG. 5C are plan views of various examples of adjusting a resonance frequency of the deflecting unit shown in FIG. 2.
Figure 5B:
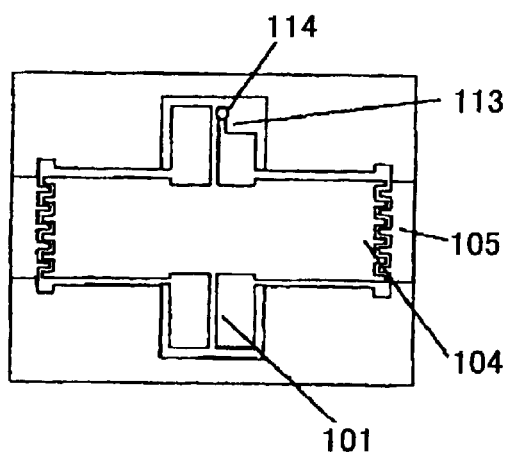
Figure 5C:
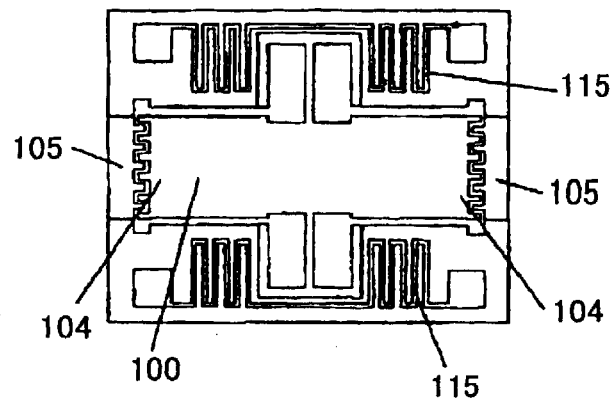

To solve this inconvenience, the deflecting units (the oscillation mirror deflectors) need to have substantially equal scanning frequencies. As mentioned above, the resonance frequency is represented by fd=√(K/J) where K=G·I/L. Changing any of these parameters enables an adjustment of the resonance frequency and the scanning frequency. FIG. 5A to FIG. 5C illustrate various frequency varying means for adjusting the scanning frequency.

In FIG. 5A, a large width part 111 is provided at the root of the torsion bar 101, and an indentation portion 112 is formed by using a carbon dioxide laser and so forth so as to substantially adjust the length L of the torsion bar 101. In FIG. 5B, a groove 113 is provided at the root of the torsion bar 101, and the groove 113 is filled by using with an adhesive 114 and so forth so as to substantially adjust the length L of the torsion bar 101. By using any of the means shown in FIG. 5A and FIG. 5B, changing L of the torsion bar 101 enables an adjustment of the resonance frequency of the oscillation mirror 100. Thereby, the scanning frequency can be adjusted.

In FIG. 5C, thin-film resistances are formed in pectinate patterns in parts adjacent to the roots of the torsion bars 101 so as to form heaters 115, and the heaters 115 are energized and thus heated so that the parts adjacent to the roots of the torsion bars 101 undergo thermal expansion so as to change the moment of inertia J. Thereby, the resonance frequency of the oscillation mirror 100 can be adjusted so that the scanning frequency is adjusted.

Figure 6:
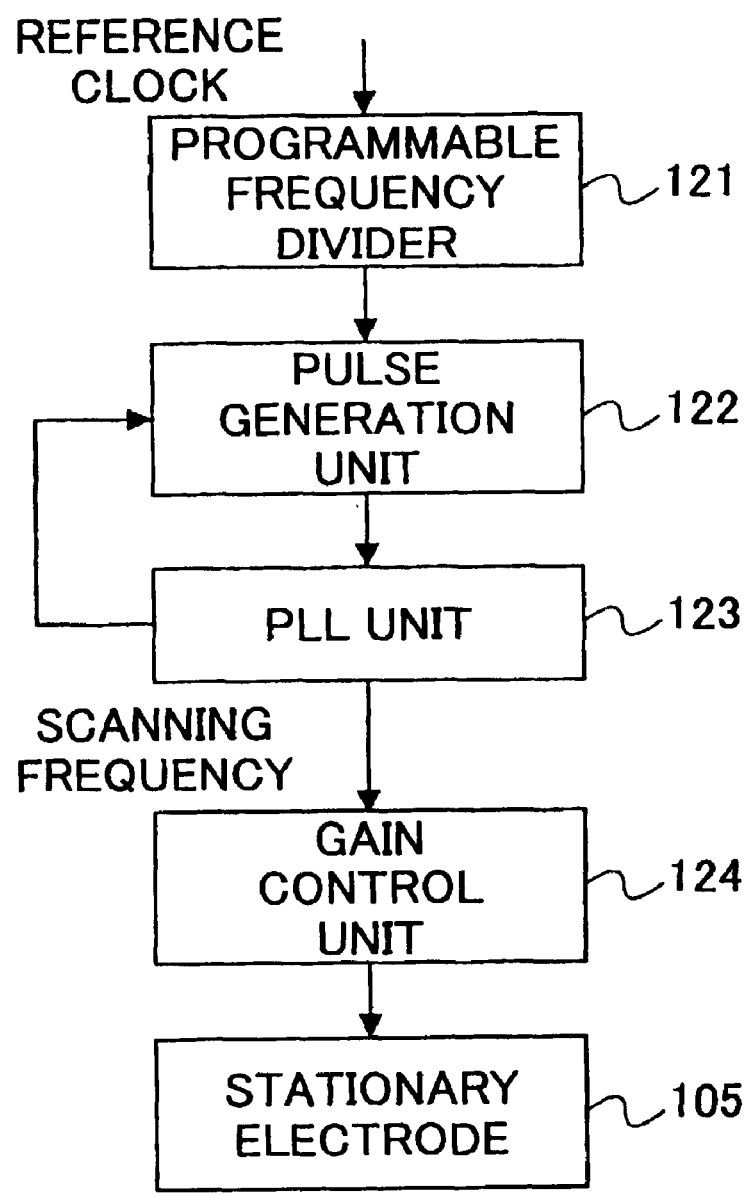
FIG. 6 is a block diagram of an example of a scanning frequency control unit for controlling a scanning frequency of the deflecting unit shown in FIG. 2.

The sine-wave oscillation mirror provides an advantage that, when the scanning frequency and the resonance frequency coincide, a maximum gain results so that a low voltage suffices for a driving power. Varying a reference clock with respect to the resonance frequency enables the scanning frequency to be varied. FIG. 6 is a block diagram of a control unit (frequency varying means) therefor. In FIG. 6, a reference clock is frequency-divided by a programmable frequency divider 121, and is supplied to a pulse generation unit 122. The pulse generation unit 122 counts the number of pulses according to the above-mentioned frequency-divided clock pulses so as to generate a clock. At this point, when the original reference clock is adjustable, the clock to be generated is also adjustable. A PLL unit 123 detects phases of the clock, and when there is a phase difference, the PLL unit 123 outputs an updated clock. A gain control unit 124 controls the voltage impressed to the stationary electrode 105 according to a period of the clock. Increasing the voltage enlarges the amplitude of the oscillation mirror. The scanning optical systems determine the respective voltages so that the amplitudes become equal.

In this course, since the scanning frequency varies from the resonance frequency, the amplitudes become unequal; however, increasing the driving voltages keeps the amplitudes constant. Additionally, it is preferred that a target value of the scanning frequency is set midway between a maximum value and a minimum value of the resonance frequency intrinsic to each of the deflecting units. This setting narrows a dynamic range of the above-described adjustment, enabling the frequencies to be adjusted more precisely.

In the heretofore-described examples, the scanning frequency is adjusted. Hereinbelow, a description will be given of a method in which the scanning frequency is not adjusted. FIG. 7A and FIG. 7B illustrate the above-mentioned scanning lines joined in the main scanning direction. To make the description simple, only two scanning optical systems are arranged in the following examples. In FIG. 7A and FIG. 7B, a transverse direction is the main scanning direction, and a vertical direction is the sub-scanning direction. An image recording is performed only in the "forth" period of the reciprocating oscillation. FIG. 7A show a comparative example. FIG. 7B show an example of the present embodiment. As described above, when the scanning optical systems are driven by individual scanning frequencies, the scanning frequencies come to differ from one another. For example, in the example of the present embodiment shown in FIG. 7B, since a scanning frequency with respect to the scanning lines at the right is higher than a scanning frequency with respect to the scanning lines at the left, the scanning lines come close to one another in the vertical direction so that a displacement of positions of the right and left scanning lines at a joint therebetween becomes gradually larger. For instance, with respect to the scanning lines to form a line n (an nth line), the positions of the scanning lines are displaced by approximately one period, and with respect to the scanning lines to form a line 2n, the positions of the scanning lines are displaced by approximately two periods.

Thereupon, the scanning optical system at the right side changes a timing of the image recording once in n periods so that nth image data is recorded at a position at which a line n+1 is originally recorded. Similarly, 2n-th image data is recorded at a position at which a line 2n+2 is originally recorded. In this course, the image recording is not performed at the line n and the line 2n+1. Thus, with respect to at least one of a plurality of the scanning optical systems, the timing of the image recording is changed once in a predetermined number of scanning periods; thereby, a displacement of positions of scanning lines in the sub-scanning direction at a joint thereof between a plurality of the scanning optical systems can be prevented from exceeding an interval between lines within one period; accordingly, a high-quality image can be obtained.

Thus, in the optical scanning device according to the second embodiment, at least one of the scanning optical systems changes the timing of the image recording every predetermined number of scanning periods so as to reduce a color displacement in the sub-scanning direction.

In the above-described embodiment, the timing of the image recording is changed in a same manner every predetermined number of scanning periods; however, the timing of the image recording may be changed in a different manner every predetermined number of scanning periods. FIG. 8 illustrates how a displacement of scanning lines is corrected according to a third embodiment of the present invention. To make the description simple, only two scanning optical systems are arranged also in the following example. In FIG. 8, a transverse direction is the main scanning direction, and a vertical direction is the sub-scanning direction. An image recording is performed only in the "forth" period of the reciprocating oscillation. As described above, when the scanning optical systems are driven by individual scanning frequencies, the scanning lines come close to one another in the vertical direction, since a scanning frequency with respect to the scanning lines at the right is higher than a scanning frequency with respect to the scanning lines at the left, so that a displacement $\Delta$ of positions of the scanning lines at a joint thereof becomes larger.

Generally, with a line pitch smaller than ⅛, a displacement of scanning lines is hardly recognizable; therefore, in the present embodiment, a phase of the scanning frequency with respect to the scanning lines at the right is delayed during an interval between a fifth line and a sixth line, and a displacement of scanning lines at a joint thereof is corrected so that a scanning line of the scanning optical system at the right comes to coincide with a scanning line of the scanning optical system at the left at a joint therebetween every six lines. Accordingly, repeating this correction periodically enables the scanning lines to coincide at a joint thereof every predetermined number of scanning periods. Thereby, scanning lines at a joint thereof can be prevented from being displaced beyond an acceptable value.

Figure 9:
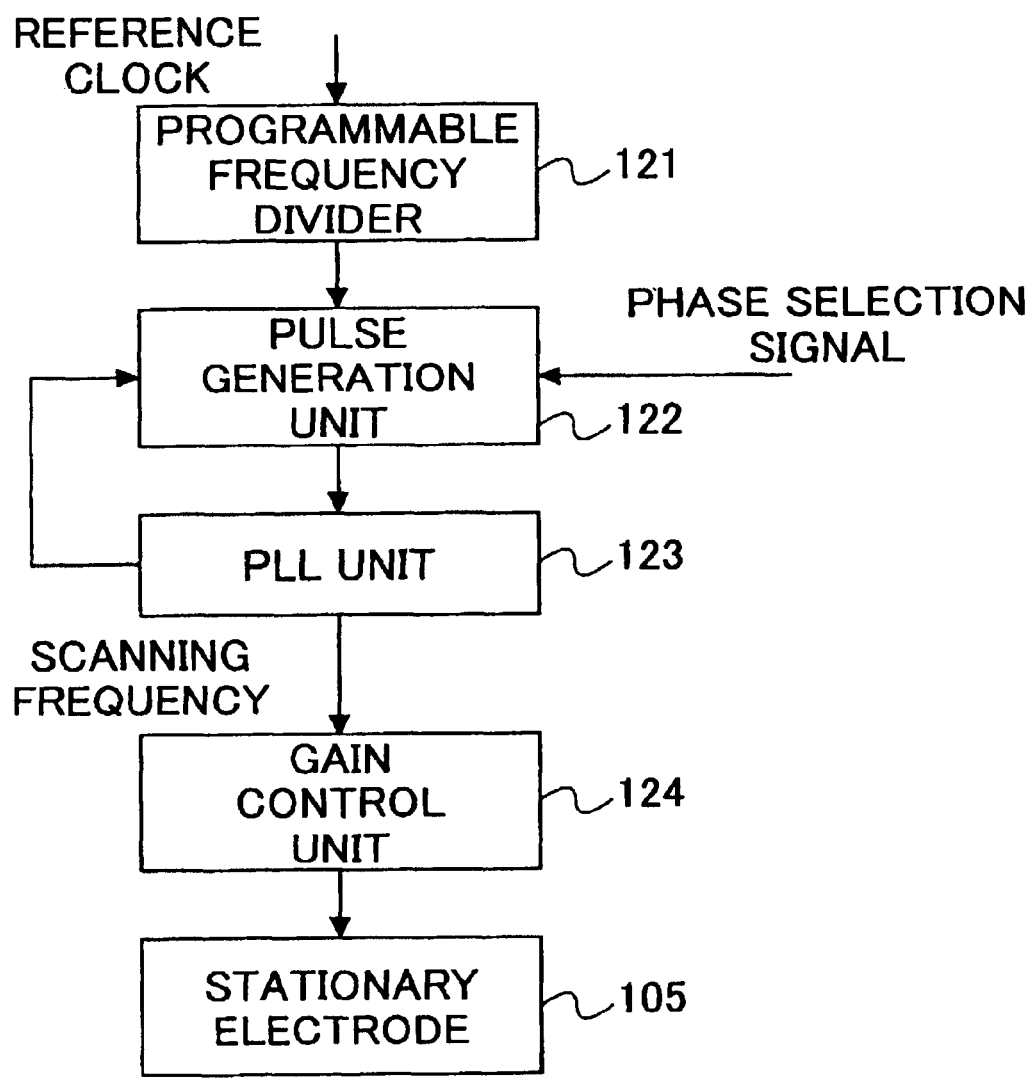
FIG. 9 is a block diagram of an example of a driving unit of the deflecting unit for correcting a displacement of positions of scanning lines of a plurality of scanning optical systems.

A similar correction as described above is possible in whatever number of the scanning optical systems. FIG. 9 is a block diagram of an example of a driving unit (frequency varying means) of the oscillation mirror deflector provided for performing a control therefor. In FIG. 9, a reference clock is frequency-divided by the programmable frequency divider 121, and is supplied to the pulse generation unit 122. The pulse generation unit 122 counts the number of pulses according to the above-mentioned frequency-divided clock pulses so as to generate a clock corresponding to the resonance frequency. The pulse generation unit 122 changes a pulse width as shown in FIG. 10A according to a phase selection signal generated by a writing control unit (not shown in the figure) every predetermined number of scanning periods, i.e., every six lines in the present embodiment, so as to delay a phase thereof.

The PLL unit 123 detects phases of the clock, and when there is a phase difference, the PLL unit 123 outputs an updated clock. The gain control unit 124 controls the voltage impressed to the stationary electrode 105 according to a period of the clock. Increasing the voltage enlarges the amplitude of the oscillation mirror. The scanning optical systems determine the respective voltages so that the amplitudes become equal.

FIG. 10B shows another example in which a phase of the scanning frequency is changed. In this example, a plurality of clocks a, b, . . . , having different phases are prepared beforehand, and the clocks are switched according to the phase selection signal. However, performing the heretofore-described changes during an image recording varies a scanning rate in the course of the image recording so as to cause a magnification error which hinders an accurate image recording.

Thereupon, performing the above-mentioned changes during an interval during which no image recording is performed, i.e., an interval other than an effective scanning period, does not cause a magnification error.

Additionally, changing a timing of an image recording every predetermined number of scanning periods, and providing a phase varying unit (e.g., the pulse generation unit 122) for changing a phase of the scanning frequency every predetermined number of scanning periods, can be applied when the deflecting unit is a polygon scanner, according to the present invention.

As describe above, each of the optical scanning devices according to the foregoing embodiments comprising the deflecting units each of which performs an optical scanning by oscillation is provided with a plurality of gain adjusting units (e.g., the gain control unit 124) each of which varies the amplitude of the oscillation mirror. Accordingly, all of the scanning optical systems have the same scanning frequency so as to reduce a dot position displacement and a color displacement in the main scanning direction.

Besides, although the oscillation of the deflecting unit is a sine-wave oscillation in general, the present invention is applicable when the oscillation is other than the sine-wave form.

Additionally, in the above-described embodiments, although the light source of each of the scanning optical systems is a single light source, the present invention is applicable when the light source is a multibeam.

Figure 11A:
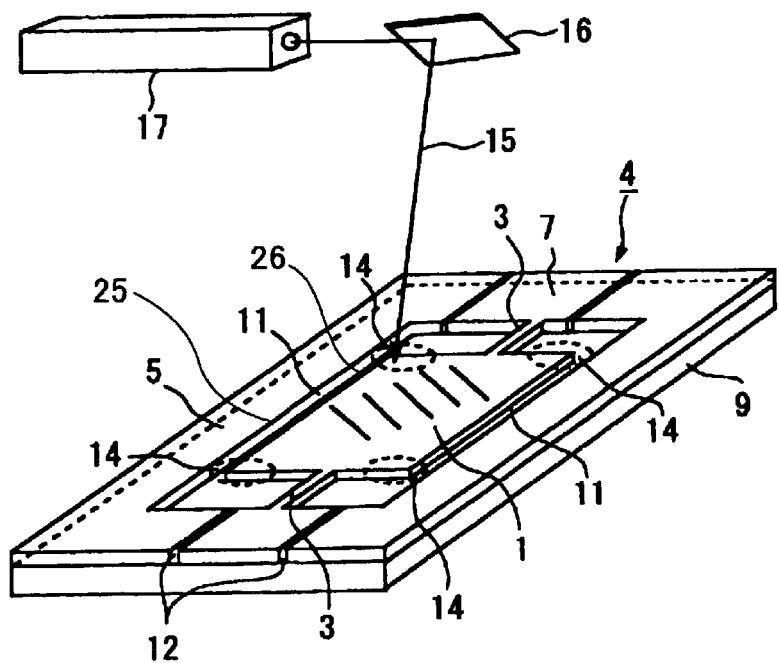
FIG. 11A is a perspective view of an optical scanner according to a fourth embodiment of the present invention.
Figure 11B:
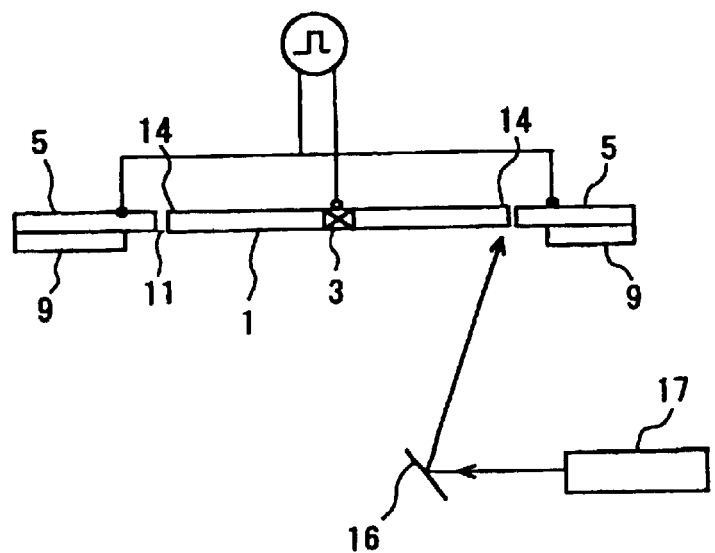
FIG. 11B is a sectional view of the optical scanner shown in FIG. 11A.

FIG. 11A is a perspective view of an optical scanner 4 according to a fourth embodiment of the present invention. FIG. 11B is a sectional view of the optical scanner 4 shown in FIG. 11A.

A mirror substrate 7 composed of silicon supports the mirror 1. The mirror 1 has the elastic members 3, such as twist springs, provided on end surfaces thereof by etching. The moving electrode 26 is provided on each of side surfaces of the mirror 1. The stationary electrode 25 is provided on the stationary member 5 opposite the moving electrode 26. Further, a discharge gap 11 is formed between each of the side surfaces of the mirror 1 and the stationary member 5. The mirror substrate 7 thus formed is joined to a frame substrate 9 composed of insulating materials, such as glass and ceramics. Further, separation grooves 12 are formed in the mirror substrate 7 joined to the frame substrate 9. The separation grooves 12 are processed by using a $CO_2$ laser and so forth. The separation grooves 12 electrically separate the mirror 1 and the stationary member 5. The optical scanner 4 is structured as described above.

In the present embodiment, an electrostatic force is used as a driving source for causing the mirror 1 to oscillate back and forth. However, other driving sources may be used, which includes a polarization force originating from a piezoelectric material, such as a PZT, or an electric/magnetic force originating from a magnetic material.

Next, a description will be given of an operation of the optical scanner 4. A voltage is impressed between the mirror 1 and the stationary member 5. An electrostatic suction force occurs from an electrostatic field formed in the discharge gap 11. Due to this force, the mirror 1 starts revolving movements with the elastic members 3 being as a rotary axis. In this course, when a frequency of the impressed voltage coincides with a resonance frequency (f0) determined by the elastic members 3 and the moment of inertia of the mirror 1, the oscillation becomes a resonant oscillation so that the mirror 1 attains a large oscillation angle.

At this point, the resonance frequency f0 is obtained by the following expression 1 according to the moment of inertia (I) of the mirror and the spring constant (Kθ) determined by the two elastic members, as mentioned above.

$$f0 = \tfrac{1}{2}\pi\sqrt{(K\theta/I)} \quad \text{(Expression 1)}$$

In this expression, for example, when the moment of inertia (I) is $6.3 \times 10^{-5}$ g·cm$^2$, and the spring constant (Kθ) is 6076 dyne-cm/rad, the resonance frequency f0 is 1.5 kHz. Then, when the moment of inertia (I) is reduced by 10%, the resonance frequency f0 becomes 1.64 kHz so that the resonance frequency f0 is increased by approximately 150 Hz. According to the above-described principle, in the present embodiment, an optical scanning device is provided with resonance-frequency adjusting means for adjusting the resonance frequency f0 of the mirror 1 so as to make the oscillation angle constant.

Here, a description will be given of the resonance-frequency adjusting means for adjusting the resonance frequency of the mirror 1. FIG. 11A and FIG. 11B also show a $CO_2$ laser 17 and a mirror 16 used for changing a location of projecting a laser beam 15 emitted from the $CO_2$ laser 17. To reduce the moment of inertia of the mirror 1, an edge surface 14 of the mirror 1 is irradiated with the laser beam 15 from a back surface of the mirror 1 so that a heat generated by the laser beam 15 at the irradiated location evaporates a micro mass of the edge surface 14. Thereby, the moment of inertia of the mirror 1 is reduced. Thus, evaporating the micro mass of the back surface of the mirror 1 enables the moment of inertia of the mirror to be reduced without damaging a front surface of the mirror or posing an extra force on the elastic members 3.

Figure 12:
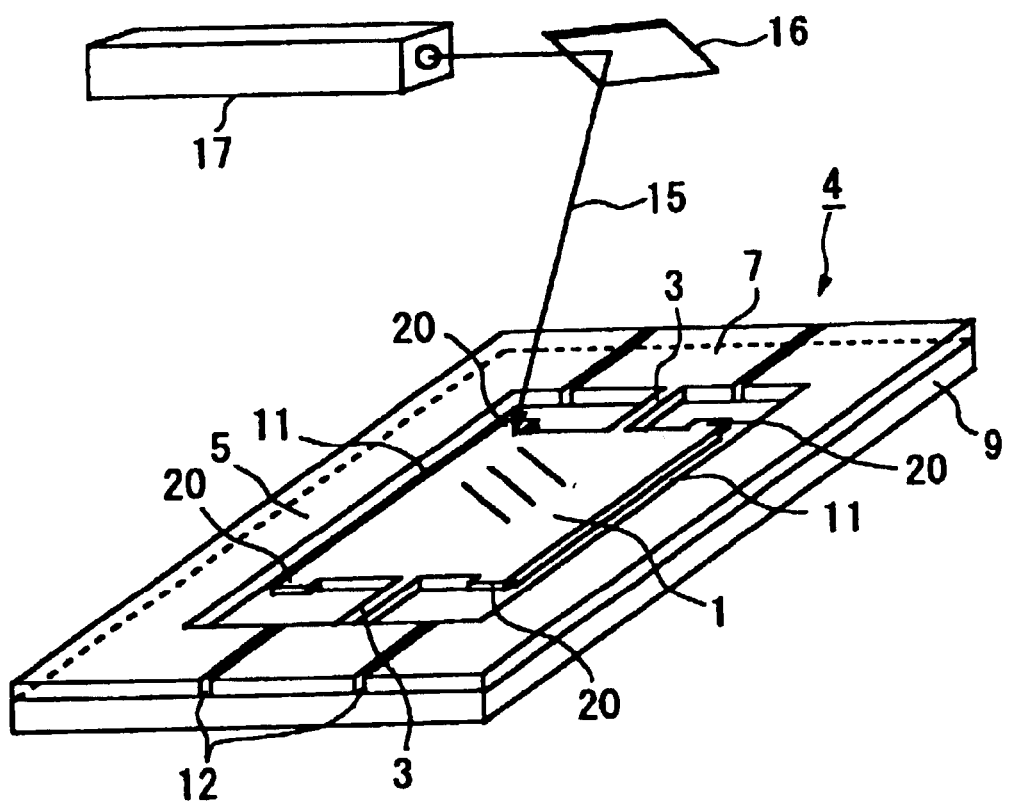
FIG. 12 is a perspective view of an optical scanner according to a fifth embodiment of the present invention.

FIG. 12 is a perspective view of the optical scanner 4 according to a fifth embodiment of the present invention. Segment pieces 20 are provided at edge portions of the mirror 1. The segment pieces 20 are used for adjusting the moment of inertia of the mirror. Each of the segment pieces 20 has a thickness smaller than a thickness of the mirror 1. Accordingly, when a boundary surface between the segment piece 20 and the mirror 1 is irradiated with the laser beam 15 emitted from the $CO_2$ laser 17, the thin segment piece 20 undergoes a sharp increase in temperature so as to be separated from the mirror 1. In this course, the mirror 1 is affected less by the heat generated by the laser beam 15. The moment of inertia of the mirror is reduced by a proportion corresponding to the separated segment piece 20; thereby, the resonance frequency can be adjusted quantitatively.

Figure 13:
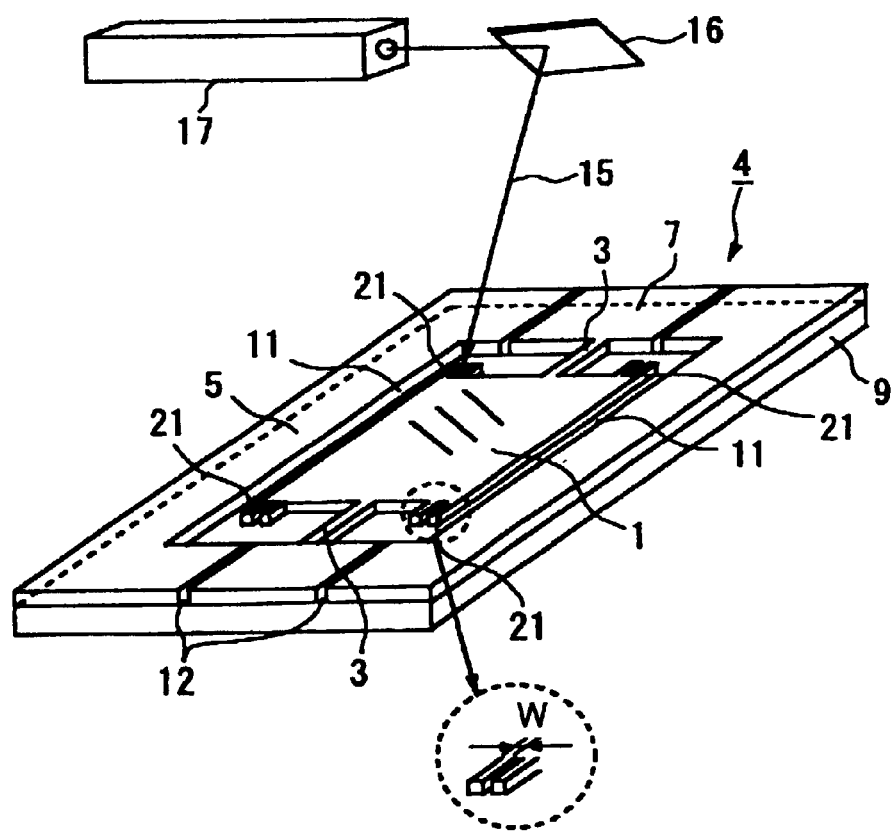
FIG. 13 is a perspective view of an optical scanner according to a sixth embodiment of the present invention.

FIG. 13 is a perspective view of the optical scanner 4 according to a sixth embodiment of the present invention. Pectinate segment pieces 21 are provided at edge portions of the mirror 1. The pectinate segment pieces 21 are used for adjusting the moment of inertia of the mirror. Each of the pectinate segment pieces 21 has teeth each of which has a width W of several hundred micrometers. Accordingly, when a boundary surface between the pectinate segment piece 21 and the mirror 1 is irradiated with the laser beam 15 emitted from the $CO_2$ laser 17, the segment piece 21 that is sufficiently smaller than the mirror 1 undergoes a sharp increase in temperature so as to be separated from the mirror 1. In this course, the mirror 1 is affected less by the heat generated by the laser beam 15. The moment of inertia of the mirror is reduced by a proportion corresponding to the separated segment piece 21; thereby, the resonance frequency can be adjusted quantitatively.

In addition, the optical scanning device according to the present invention comprises frequency varying means for varying a frequency of the voltage impressed between the mirror 1 and the stationary member 5, besides the above-described resonance-frequency adjusting means for adjusting the resonance frequency.

Figure 14:
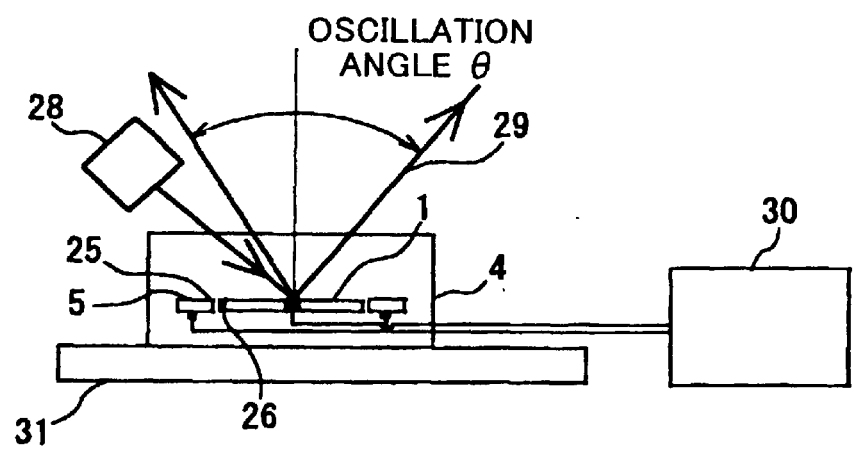
FIG. 14 is a sectional view of an optical scanner according to a seventh embodiment of the present invention.

FIG. 14 is a sectional view of the optical scanner 4 according to a seventh embodiment of the present invention. As mentioned above, the moving electrode 26 is provided on each of the side surfaces of the mirror 1. The stationary electrode 25 is provided on the stationary member 5 opposite the moving electrode 26. FIG. 14 also shows a laser light source 28, and a laser beam 29 reflected on the mirror 1. A driving unit 30 includes the frequency varying means.

The resonance frequency f0 of the mirror 1 is adjusted by the above-described resonance-frequency adjusting means. A frequency of the impressed voltage is adjusted to equal the resonance frequency f0 by the driving unit 30 including the frequency varying means, and the voltage is impressed between the mirror 1 and the stationary member 5. Accordingly, an electrostatic field is formed in the discharge gap 11 so that an electrostatic suction force is generated therefrom. Due to this force, the mirror 1 starts revolving movements with the elastic members 3 being as the rotary axis. At this point, the resonance frequency f0 of the mirror 1 coincides with the frequency of the impressed voltage so that the mirror 1 oscillates resonantly with a large oscillation angle θ.

Further, the optical scanning device according to the present invention comprises voltage adjusting means for adjusting the voltage impressed between the mirror 1 and the stationary member 5, besides the above-described resonance-frequency adjusting means and the above-described frequency varying means.

In FIG. 14, the driving unit 30 also includes the voltage adjusting means in addition to the frequency varying means. Assuming that a resonance frequency f0' of the mirror 1 is adjusted by the resonance-frequency adjusting means, a voltage having the same frequency as the resonance frequency f0' is adjusted by the driving unit 30, is impressed between the mirror 1 and the stationary member 5. Accordingly, an electrostatic field is formed in the discharge gap 11 so that an electrostatic suction force is generated therefrom. Due to this force, the mirror 1 starts revolving movements with the elastic members 3 being as the rotary axis. At this point, the mirror 1 oscillates resonantly.

Figure 15:
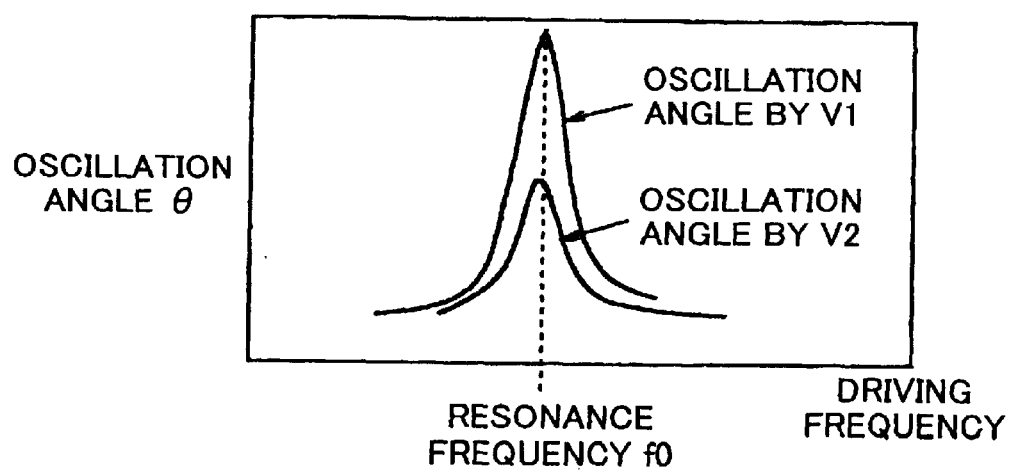
FIG. 15 is a graph showing relations between impressed voltages at a particular frequency and an oscillation angle of a mirror.

FIG. 15 shows relations between impressed voltages at a particular frequency and the oscillation angle of the mirror 1. As shown in FIG. 15, when the impressed voltages per se are different by being V1 and V2, respectively, the oscillation angle θ of the mirror 1 varies, even though the impressed voltages V1 and V2 have the same resonance frequency f0'.

This phenomenon is explicable as follows. An oscillation angle θ of the mirror 1 in a resonant oscillation is generally determined by the following expression 2.

$$\theta = (Tq/I) \cdot K \quad \text{(Expression 2)}$$

In this expression, Tq represents an electrostatic torque acting on the mirror 1, I represents a moment of inertia of the mirror, and K represents a constant determined by the resonance frequency.

The following relational expression 3 stands for the electrostatic torque Tq.

$$Tq \propto S \cdot (V/g)^2 \qquad \text{(Expression 3)}$$

In this expression, S represents an interelectrode opposing area, V represents an impressed voltage, and g represents an interelectrode distance. From the expressions 2 and 3, it is known that the oscillation angle θ of the mirror 1 varies according to the electrostatic torque Tq which depends on the impressed voltage V.

Accordingly, by utilizing the above-described principle, even after the frequency of the impressed voltage is adjusted to the resonance frequency f0′, the impressed voltage per se can be adjusted by the driving unit 30 so as to obtain a desired oscillation angle θ of the mirror 1. For instance, when the resonance frequency of the mirror 1 fails to coincide perfectly with the frequency of the impressed voltage, the oscillation angle θ of the mirror 1 becomes smaller than when the resonance frequency of the mirror 1 coincides perfectly with the frequency of the impressed voltage; at this point, however, the impressed voltage can be adjusted by the voltage adjusting means so as to adjust the oscillation angle θ of the mirror 1.

Additionally, the optical scanning device according to the present invention may comprise a micro mirror utilizing a micromachining technology.

Figure 16A:
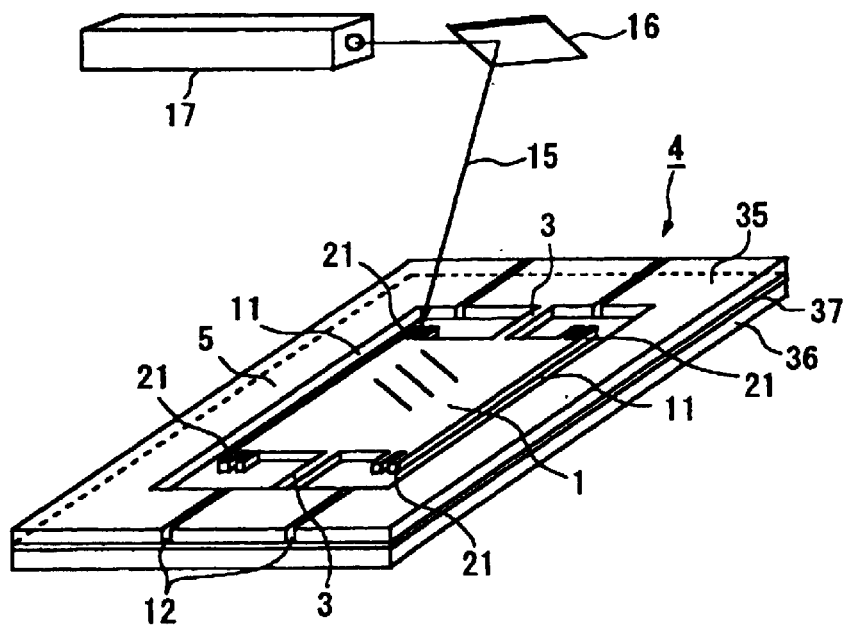
FIG. 16A is a perspective view of an optical scanner according to an eighth embodiment of the present invention.
Figure 16B:
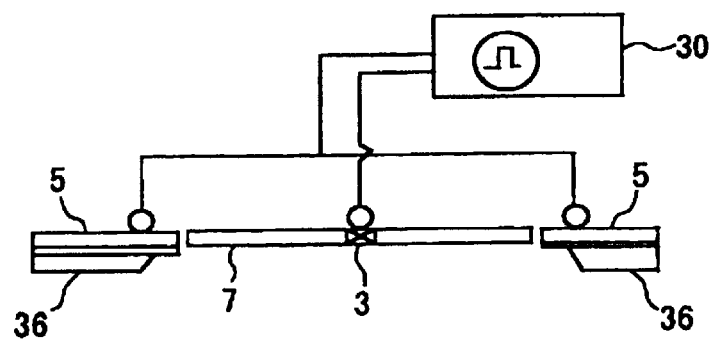
FIG. 16B is a sectional view of the optical scanner shown in FIG. 16A.

FIG. 16A is a perspective view of the optical scanner 4 according to an eighth embodiment of the present invention. FIG. 16B is a sectional view of the optical scanner 4 shown in FIG. 16A.

A first substrate 35 composed of silicon supports the mirror 1 having the elastic members 3. The first substrate 35 has conductivity as a property of silicon. The pectinate segment pieces 21 used for adjusting the resonance frequency are provided at the edge portions of the mirror 1. A second substrate 36 is also composed of silicon. The first substrate 35 and the second substrate 36 are joined to each other with an insulating layer 37 therebetween. The insulating layer 37 is composed of silicon dioxide and so forth. Further, the separation grooves 12 are formed in the first substrate 35 by etching and so forth. The separation grooves 12 electrically separate the mirror 1 and the stationary member 5.

Additionally, FIG. 16B shows the driving unit 30 that includes the frequency varying means for varying the frequency of the impressed voltage, and the voltage adjusting means for adjusting the impressed voltage.

In a state where the resonance frequency is adjusted at f0, when a voltage having a frequency f0 is impressed to the mirror 1 and the stationary member 5, the mirror 1 functions as a moving electrode, and the stationary member 5 functions as a stationary electrode, because both the mirror 1 and the stationary member 5 are conductive. Accordingly, an electrostatic field is formed in the discharge gap 11; due to an electrostatic suction force generated therefrom, the mirror 1 exhibits a resonant oscillation.

Figure 17:
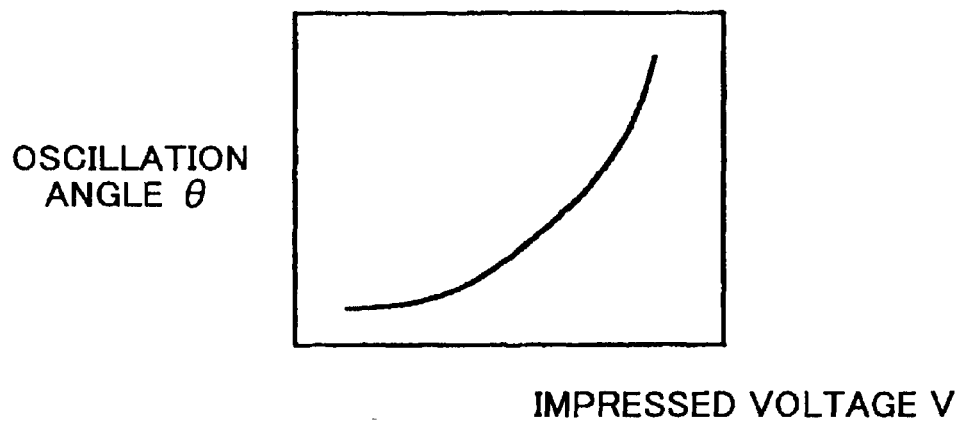
FIG. 17 is a graph showing a relation between an impressed voltage V and an oscillation angle θ of the mirror.

FIG. 17 shows a relation between the impressed voltage V and the oscillation angle θ of the mirror 1. As shown in FIG. 17, when the impressed voltage V is changed by the driving unit 30, the oscillation angle θ varies accordingly. Thus, adjusting the impressed voltage V obtains a desired oscillation angle θ of the mirror 1.

Additionally, the micromachining technology using silicon reduces processing-related errors of the mirror 1 and the elastic members 3 so as to narrow a range for adjusting the frequencies, the impressed voltage and so forth.

In the optical scanner according to the present invention, the mirror 1 can take the following forms so as to enlarge the oscillation angle of the mirror 1.

Figure 18:
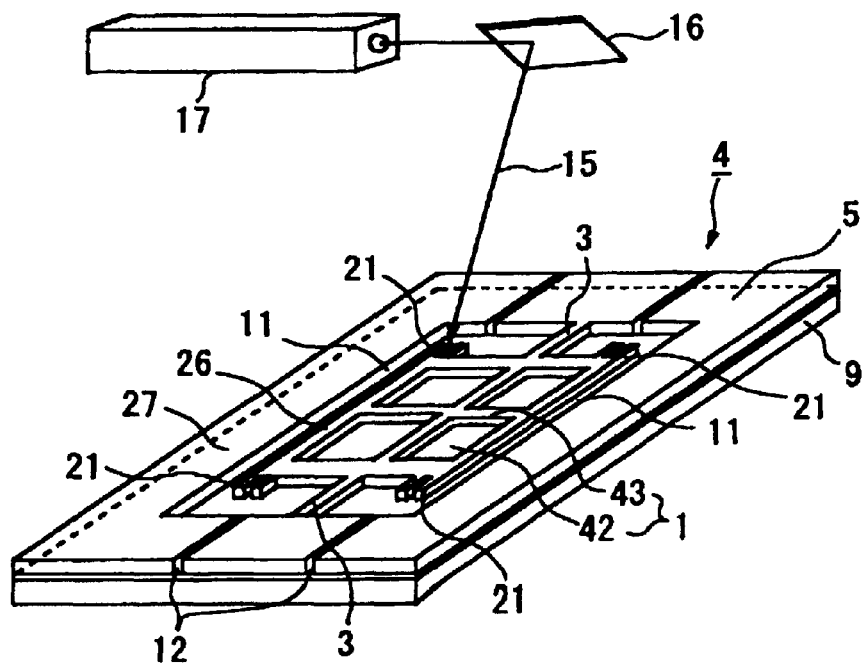
FIG. 18 is a perspective view of an optical scanner according to a ninth embodiment of the present invention.
Figure 19:
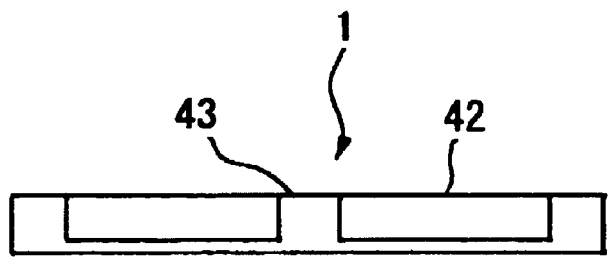
FIG. 19 is a sectional view of a mirror shown in FIG. 18.

FIG. 18 is a perspective view of the optical scanner 4 according to a ninth embodiment of the present invention. FIG. 19 is a sectional view of the mirror 1 shown in FIG. 18. In the present embodiment, the mirror 1 is formed by hollow portions 42 that are hollowed and rib portions 43 that are not hollowed. Thus, since the mirror 1 is partially hollowed, the moment of inertia (I) in the expression 2 becomes small. Accordingly, the oscillation angle θ of the mirror 1 can be made even larger.

In the optical scanner according to the present invention, the electrodes formed on the mirror 1 and the stationary member 5 can take the following forms so as to enlarge the oscillation angle of the mirror 1.

Figure 20:
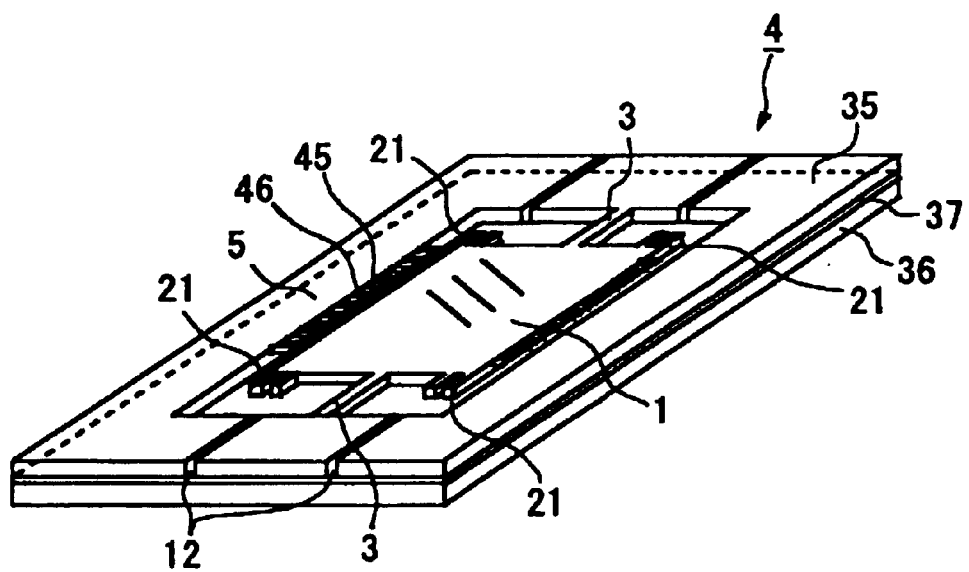
FIG. 20 is a perspective view of an optical scanner according to a tenth embodiment of the present invention.

FIG. 20 is a perspective view of the optical scanner 4 according to a tenth embodiment of the present invention. In the present embodiment, a moving electrode 45 in a pectinate form is provided on each of the side surfaces of the mirror 1, and a stationary electrode 46 in a similar pectinate form is provided on the stationary member 5 so as to oppose the moving electrode 45. The moving electrode 45 and the stationary electrode 46 engage each other with a predetermined clearance therebetween. This configuration increases the interelectrode opposing area S in the above-described expression 3. When the interelectrode opposing area S is increased, the electrostatic torque Tq is increased accordingly. The increase in the electrostatic torque Tq enlarges the oscillation angle θ of the mirror 1 determined by the expression 2.

The optical scanning device according to the present invention may comprise a plurality of the optical scanners 4 of each of the above-described embodiments.

Figure 21:
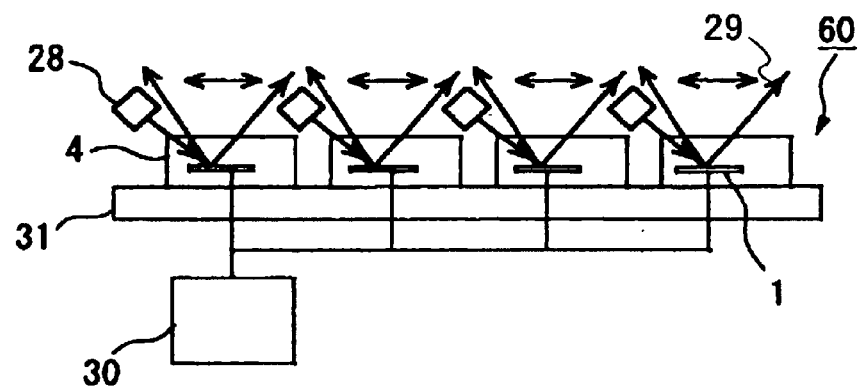
FIG. 21 is a sectional view of an optical scanning device according to the present invention.

FIG. 21 is a sectional view of an optical scanning device 60 according to the present invention. As shown in FIG. 21, a plurality of the optical scanners 4 are arranged on a base 31. The driving unit 30 impresses a driving voltage. FIG. 21 also shows the laser light source 28, and the laser beam 29 reflected on the mirror 1.

Figure 22:
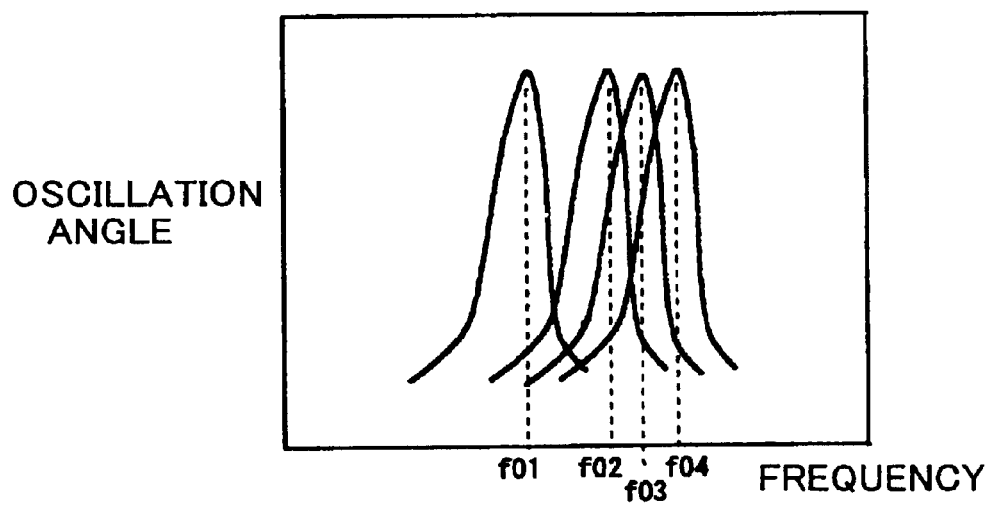
FIG. 22 is a graph showing results of measuring resonance frequencies f0 n of respective optical scanners shown in FIG. 21.

FIG. 22 shows results of measuring resonance frequencies f0n of the respective optical scanners 4. As shown in FIG. 22, the optical scanners 4 have individual resonance frequencies. When a resonance frequency f04 is the largest, resonance frequencies f01, f02 and f03 of the other optical scanners 4 are so adjusted as to coincide with the resonance frequency f04 by the resonance-frequency adjusting means. Accordingly, the driving unit 30 needs to prepare only one driving frequency; thus, a driving circuit becomes simple.

Further, an image forming apparatus according to the present invention comprises the above-described optical scanning device according to the present invention.

Figure 23:
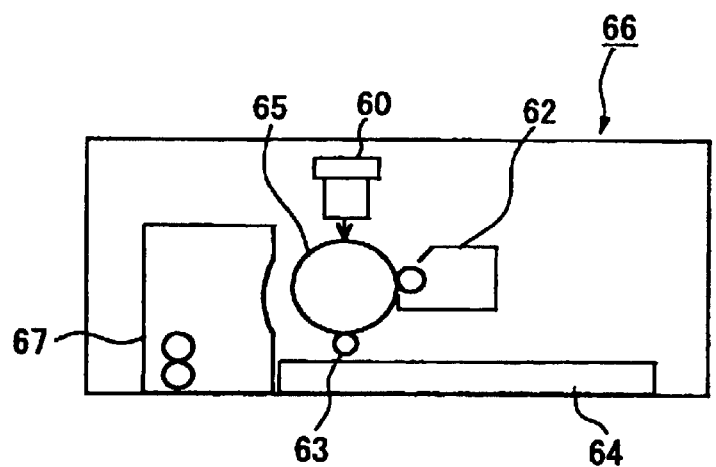
FIG. 23 is a diagram illustrating a configuration of a laser printer as an example of an image forming apparatus according to the present invention.

FIG. 23 is a diagram illustrating a configuration of a laser printer 66 as an example of the image forming apparatus according to the present invention. As shown in FIG. 23, the laser printer 66 as the image forming apparatus comprises the above-described optical scanning device 60, a photosensitive member 65, a developing unit 62, a transferring unit 63, a recording member feeding unit 64, and a fixing unit 67. An electrostatic latent image is formed on the photosensitive member 65 by a reflected laser light deflected by the mirror 1 of the optical scanning device 60. The electrostatic latent image formed on the photosensitive member 65 is developed with a toner by the developing unit 62. The toner image formed on the photosensitive member 65 is transferred to a recording member by the transferring unit 63. The recording member is fed by the recording member feeding unit 64. The toner image on the recording member is fixed by the fixing unit 67.

Figure 24:
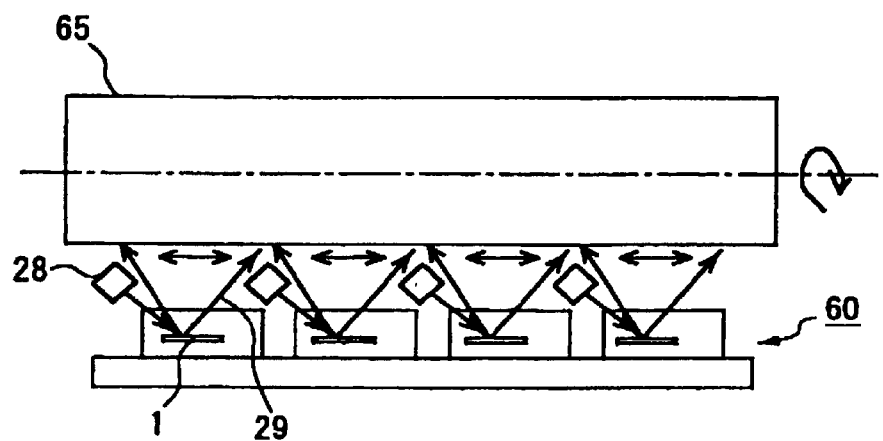
FIG. 24 is an inverted magnification view of the optical scanning device and a photosensitive member shown in FIG. 23.

FIG. 24 is an inverted magnification view of the optical scanning device 60 and the photosensitive member 65 shown in FIG. 23. A plurality of the optical scanners 4 are arranged in a main scanning direction. The laser light source 28 emits a laser beam according to an image signal generated by an image signal generation unit (not shown in the figure). The laser beam emitted by the laser light source 28 enters the optical scanning device 60. The reflected laser light 29 deflected by the mirror 1 of the optical scanning device 60 forms an electrostatic latent image on the photosensitive member 65.

Next, a description will be given of an eleventh embodiment of the present invention.

Figure 25A:
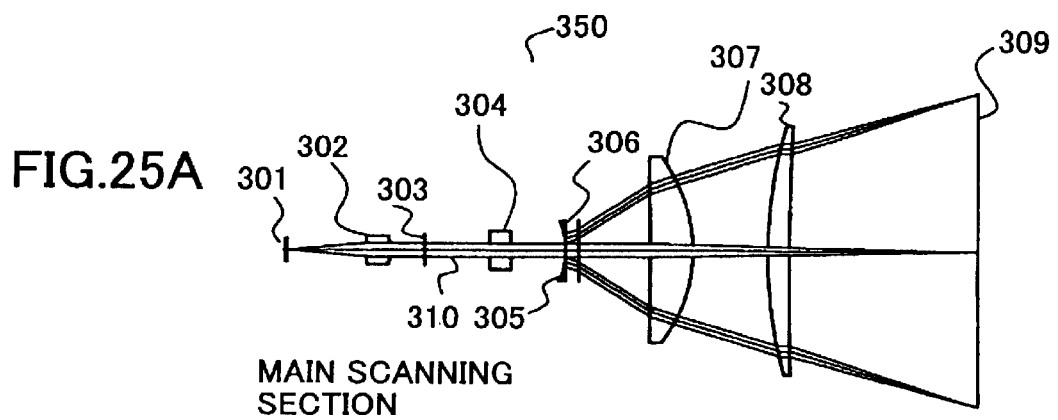
FIG. 25A is a plan view symbolically illustrating a configuration of a scanning optical system used in an optical scanning device according to an eleventh embodiment of the present invention.
Figure 25B:
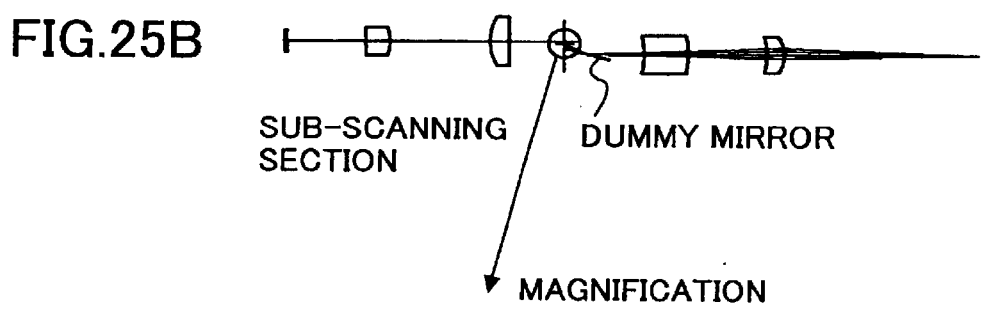
FIG. 25B is a side view symbolically illustrating the configuration of the scanning optical system shown in FIG. 25A.
Figure 25C:
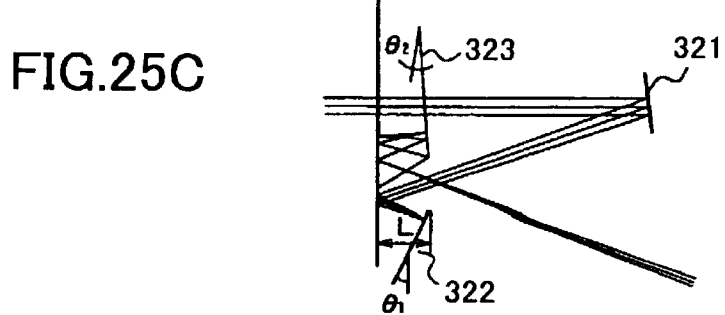
FIG. 25C is a magnification view of a part shown in FIG. 25B.

FIG. 25A is a plan view symbolically illustrating a configuration of a scanning optical system 350 used in an optical scanning device according to the eleventh embodiment of the present invention. FIG. 25B is a side view symbolically illustrating the configuration of the scanning optical system 350 shown in FIG. 25A. FIG. 25C is a magnification view of a part shown in FIG. 25B. The scanning optical system 350 shown in FIG. 25A to FIG. 25C includes a laser light source 301, a collimating lens 302, an aperture 303, a cylindrical lens 304, a deflection plane 305, stationary mirrors 306, a first scanning lens 307, a second scanning lens 308, and a scanned surface 309. As shown in FIG. 25C magnifying the part in the vicinity of the deflection plane 305 and the stationary mirrors 306 shown in FIG. 25B, the deflection plane 305 is formed by a micro mirror 320, and the stationary mirrors 306 are formed by stationary mirrors 322 and 323, along with an entrance mirror 321. A pencil (a beam) 310 is emitted from the laser light source 301. In FIG. 25C, $\theta_1$ is an angle formed by the micro mirror 320 and the stationary mirror 322, and $\theta_2$ is an angle formed by the micro mirror 320 and the stationary mirror 323.

The diverging pencil 310 emitted from the laser light source 301 becomes a substantially parallel pencil (a light beam) 310 through the collimating lens 302, and passes through the cylindrical lens 304 for forming a long linear image in a main scanning direction.

The light beam 310 is further reflected on the entrance mirror 321 so as to fall on the deflection plane with an incident angle relative to a sub-scanning section, as shown in FIG. 25C. In this course, the light beam (pencil) 310 is reflected multiple times, as shown in FIG. 25C, by using a plurality of the mirrors (321 and 322) having different planes opposing the deflection plane in the sub-scanning section. A deflector (a deflecting unit composed of the micro mirror 320, the mirrors 321 to 323 and so forth) reflects the light beam (pencil) 310 by performing a sine-wave oscillation. This multiple refection increases a scanning angle.

Arranging the two opposing mirrors having different inclinations enables a pencil separation, and reduces a wave aberration so as to reduce a beam spot diameter. In the above-mentioned course, since the deflector uses the sine-wave oscillation mirror (the micro mirror 320), the deflector per se is capable of moving alternately back and forth.

Besides, in the configuration shown in FIG. 25A to FIG. 25C, the deflector reflects the light beam 310 multiple times so as to increase an effective writing width; however, the deflector may reflect the light beam 310 once.

Figure 26:
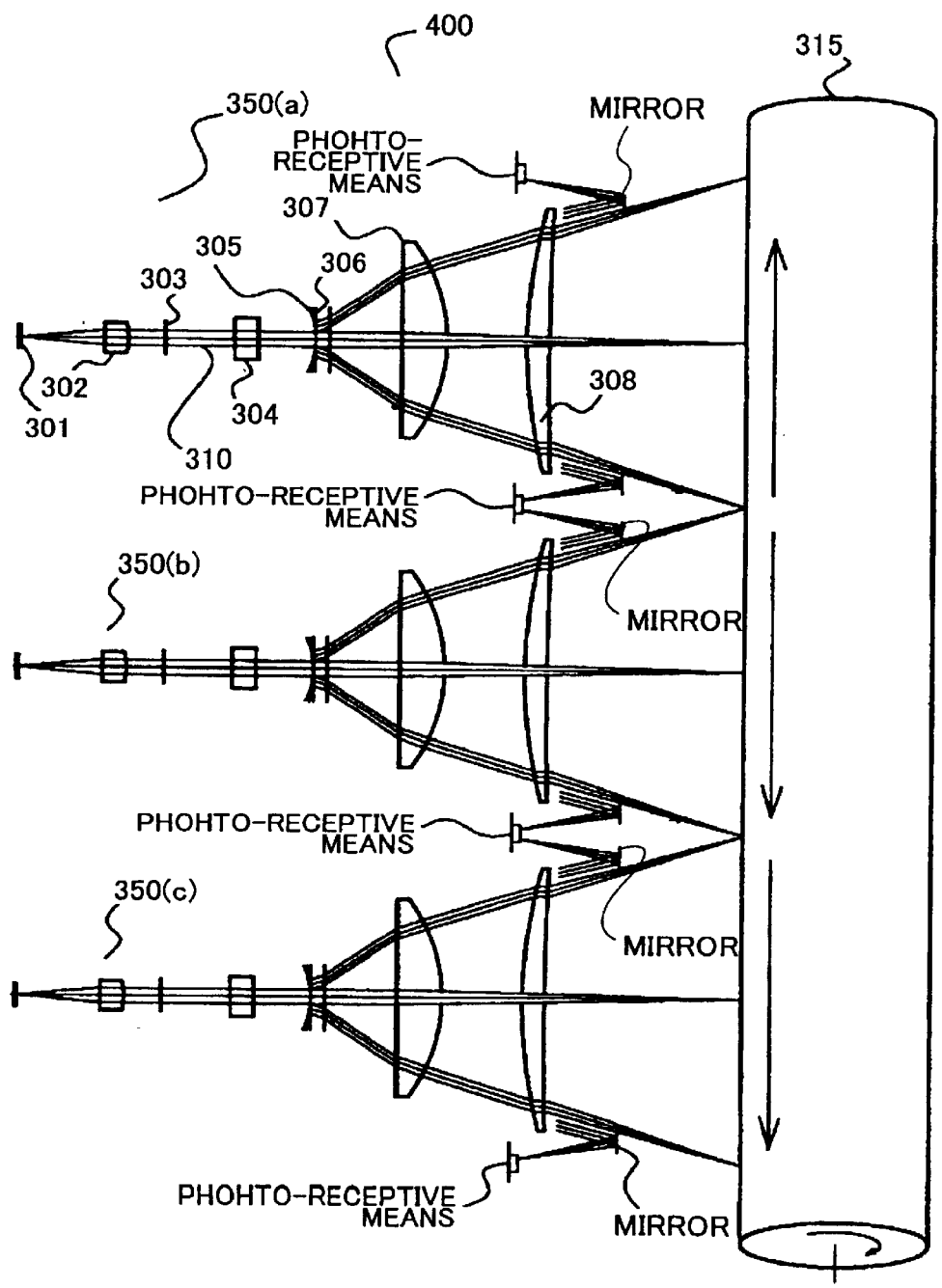
FIG. 26 is a plan view of the optical scanning device comprising three serially arranged scanning optical systems shown in FIG. 25A.

FIG. 26 is a plan view of an optical scanning device 400 comprising the three serially-arranged scanning optical systems 350(*a*), (*b*) and (*c*) described with reference to FIG. 25A to FIG. 25C. The scanning optical systems 350(*a*) to (*c*) scan on a photosensitive member (an image bearer) 315 in directions indicated by respective arrows shown in FIG. 26.

Figure 27A:
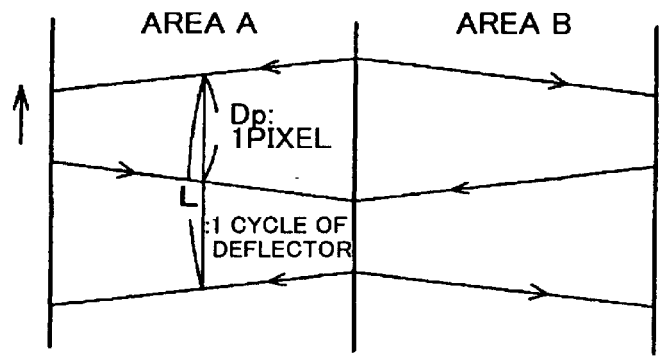
FIG. 27A to FIG. 27C are diagrams symbolically illustrating main scanning lines formed on a surface of a photosensitive member (an image bearer) by adjacent two scanning optical systems.
Figure 27B:
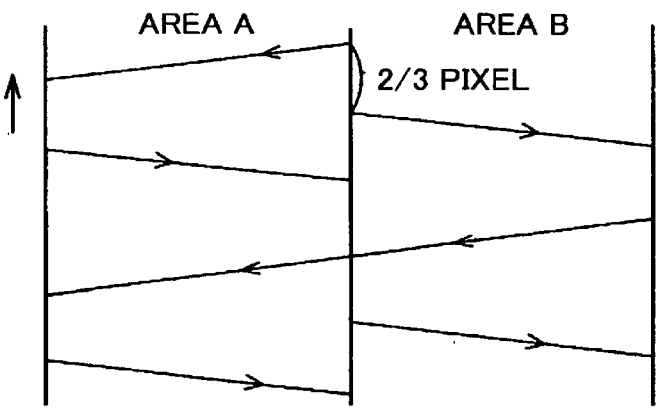
Figure 27C:
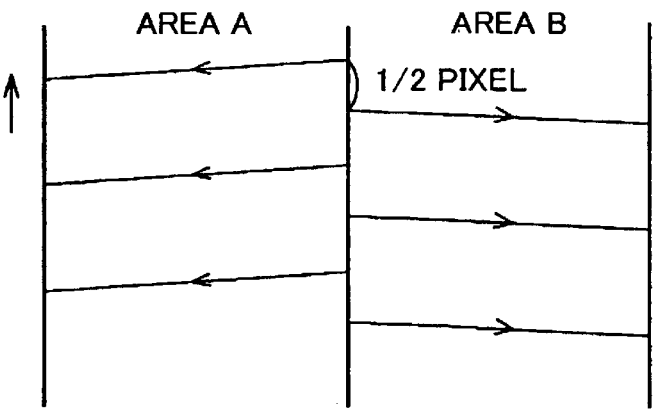

FIG. 27A to FIG. 27C show main scanning lines formed on a surface of a photosensitive member (an image bearer) by adjacent two scanning optical systems. An optical scanning device scans on the surface of the photosensitive member with light beams in the main scanning direction parallel to a rotary axis of the photosensitive member. In this course, since the photosensitive member moves in a direction indicated by an upward arrow shown in each of FIG. 27A to FIG. 27C, main scanning lines formed by a reciprocating deflector consequently have inclinations.

FIG. 27A and FIG. 27B show comparative examples in which main scanning lines are formed by reciprocating movements. Arrowheads marked on the main scanning lines indicate respective moving directions of the main scanning lines. In areas A and B, the deflectors deflect light beams according to individual timings by oscillating independently of each other.

FIG. 27A shows the example in which no dot position displacement occurs at joints of the main scanning lines. In this example, although there is no dot position displacement at the joints of the main scanning lines, deviations of intervals of the main scanning lines occur in each of the areas A and B according to the revolving movement of the photosensitive member.

FIG. 27B shows the example in which dot position displacements are maximized at joints of the main scanning lines. In this example, since the main scanning lines do not form equal intervals at the joints thereof, dot position displacements each become larger than a ½ pixel, as shown in FIG. 27B, even though the light beams are emitted according to optimal timings.

FIG. 27C shows an example in which dot position displacements are maximized at joints of main scanning lines upon a unidirectional scanning, not a reciprocating scanning. In this example, since all of the main scanning lines are pointed in an identical direction in each of the areas A and B, deviations of intervals of the main scanning lines can be reduced. In addition, since the main scanning lines form equal intervals at the joints thereof, dot position displacements each do not become larger than a ½ pixel when the light beams are emitted according to optimal timings.

Figure 28A:
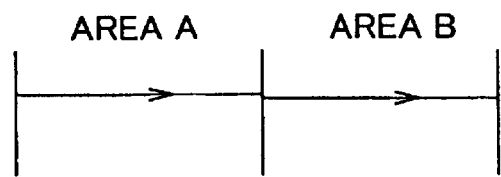
FIG. 28A to FIG. 28C are diagrams symbolically illustrating other examples in which scanning lines are formed on a surface of a photosensitive member by adjacent two scanning optical systems.
Figure 28B:
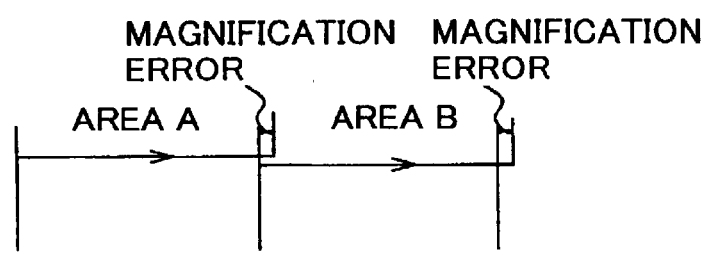
Figure 28C:
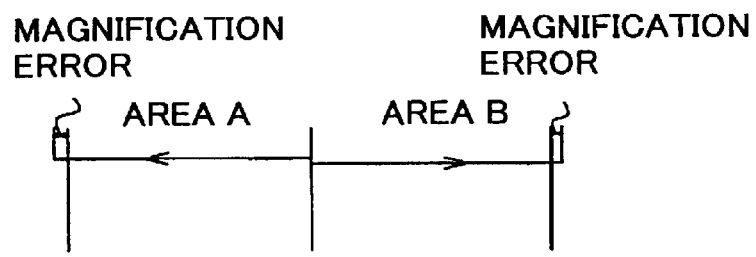

FIG. 28A to FIG. 28C show other examples in which scanning lines are formed on a surface of a photosensitive member by adjacent two scanning optical systems. In these examples, inclinations of the scanning lines formed on the surface of the photosensitive member are corrected. FIG. 28A and FIG. 28B show comparative examples in which scanning lines are pointed in an identical direction on both sides of a joint thereof. Specifically, in the example shown in FIG. 28A, no magnification error occurs in each of the areas A and B, wherein no main-scanning dot position displacement occurs at the joint of the scanning lines.

In the example shown in FIG. 28B, a magnification error occurs in each of the areas A and B. At a starting side of a scanning, each of the scanning optical systems causes a light source to emit a light beam a predetermined time after detecting a signal by photo-receptive means; therefore, whereas a dot position displacement in the main scanning direction is small at the starting side, a relatively large dot position displacement in the main scanning direction occurs at an ending side when a magnification error occurs. Accordingly, a main-scanning dot position displacement occurs at the joint of the scanning lines, as shown in FIG. 28B, which causes a density irregularity.

FIG. 28C shows an example in which scanning lines proceed in opposite directions on both sides of a joint thereof. In this example, even when a magnification error occurs, a main-scanning dot position displacement becomes small at the joint thereof, because a dot position displacement in the main scanning direction is small at a starting side of a scanning. Accordingly, image deterioration due to a density irregularity and so forth is small.

Next, a description will be given of a twelfth embodiment of the present invention.

Figure 29:
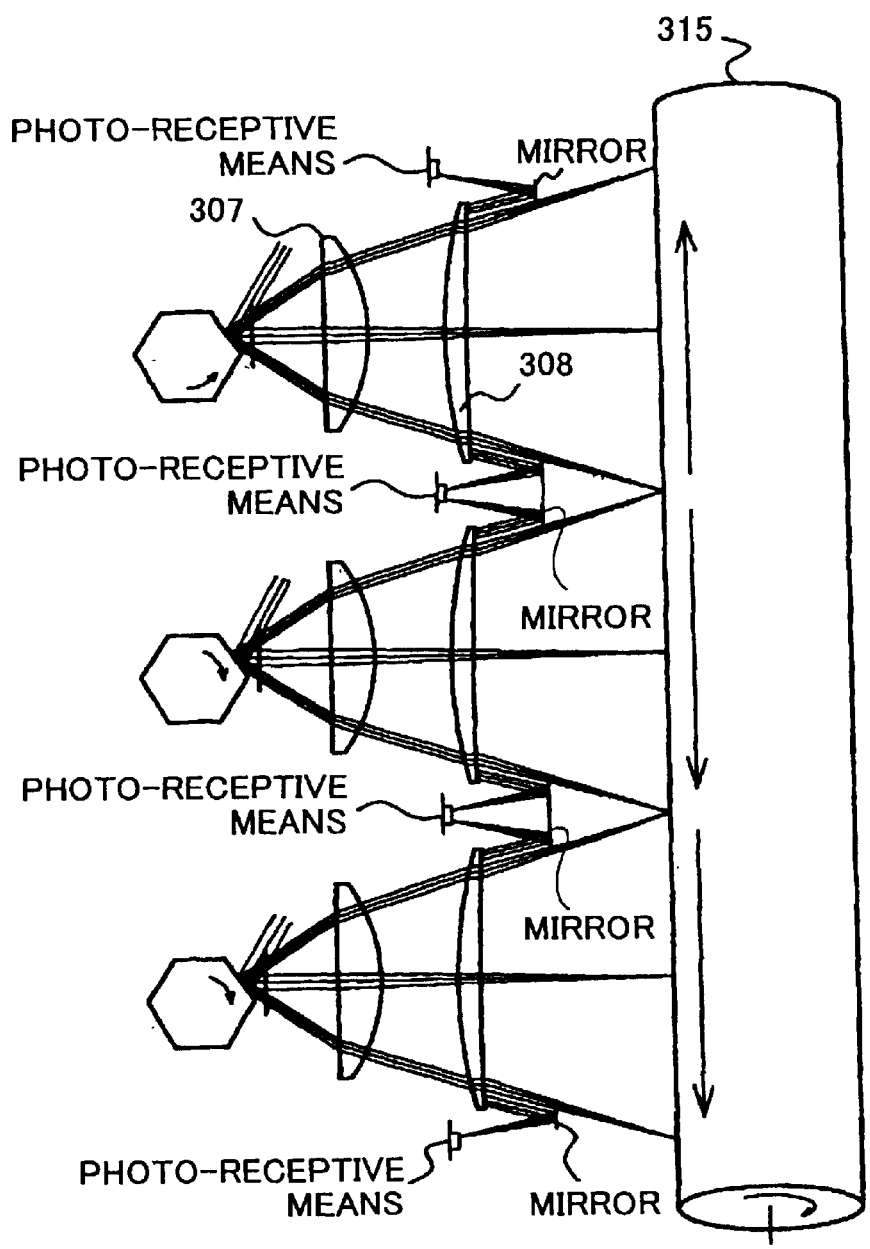
FIG. 29 is a plan view symbolically illustrating an optical scanning device comprising three scanning optical systems serially arranged in a main scanning direction, each of the scanning optical systems including a revolving deflector.

FIG. 29 is a plan view of an optical scanning device comprising three scanning optical systems serially arranged in a main scanning direction. Each of the scanning optical systems includes a deflector, such as a polygon mirror, performing a revolving movement. In this case, all of main scanning lines are subject to a unidirectional scanning, and a direction of each unidirectional scanning is also arranged to meet predetermined conditions as follows.

Figure 30A:
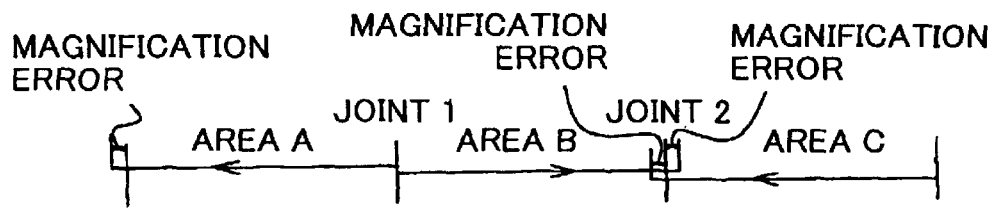
FIG. 30A and FIG. 30B are diagrams symbolically illustrating main scanning lines formed on a photosensitive member by three serially arranged scanning optical systems.
Figure 30B:
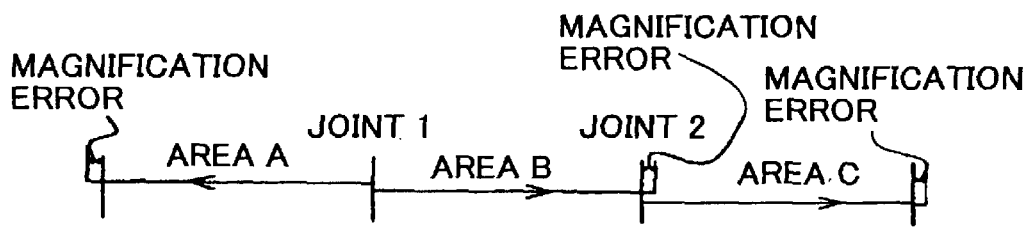

FIG. 30A and FIG. 30B show main scanning lines formed on a photosensitive member by three serially-arranged scanning optical systems. Besides, each of these scanning optical systems may include a reciprocating deflector in place of the deflector performing the revolving movement.

FIG. 30A shows a comparative example in which scanning lines on both sides of a joint 1 proceed in directions parting from the joint 1; however, on both sides of a joint 2, light beams are caused to scan in opposite directions both toward the joint 2, which contradicts the above-mentioned conditions to be met.

In this example, although a main-scanning dot position displacement is small at the joint 1, the main-scanning dot position displacement is increased at the joint 2 by an accumulation of magnification errors occurring in two areas B and C.

FIG. 30B shows an example in which scanning lines on both sides of a joint 1 proceed in directions parting from the joint 1; and, scanning lines on both sides of a joint 2 are directed in an identical direction. In this example, a main-scanning dot position displacement occurring at the joint 2 only corresponds to a magnification error occurring in an area B. Thus, the main-scanning dot position displacement is reduced.

Figure 31:
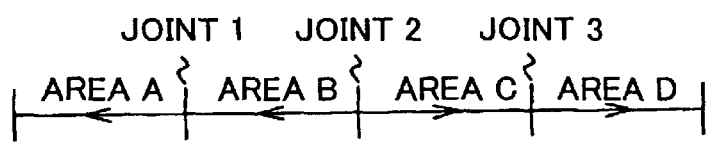
FIG. 31 is a diagram symbolically illustrating main scanning lines formed by four serially arranged scanning optical systems.

FIG. 31 is a diagram symbolically illustrating main scanning lines formed by four serially-arranged scanning optical systems. In this case, substantially no main-scanning dot position displacement occurs at a joint 2, as at the joint 1 shown in FIG. 30A and FIG. 30B; and also at joints 1 and 3, main-scanning dot position displacements are reduced, as at the joint 2 shown in FIG. 30B.

Next, a description will be given of a thirteenth embodiment of the present invention.

FIG. 32A and FIG. 32B are diagrams each of which symbolically illustrates scanning lines (depicted by solid lines) formed on a surface of a photosensitive member and scanning lines (depicted by dotted lines) scanned by an optical scanning device. Generally, the scanning lines (depicted by the solid lines) formed on the surface of the photosensitive member by movements of the photosensitive member differ from the scanning lines (depicted by the dotted lines) drawn by the optical scanning device.

FIG. 32A shows an example in which the scanning lines (depicted by the dotted lines) scanned by the optical scanning device are parallel in main scanning directions. In this example, since the scanning lines proceed in directions parting from a joint thereof, a main-scanning dot position displacement is reduced. However, since the photosensitive member moves in a direction indicated by an arrow shown in FIG. 32A, the main scanning lines are inclined so as to be formed in a peak shape.

FIG. 32B shows an example in which inclinations of the scanning lines (depicted by the dotted lines) are generated by the optical scanning device in the form of an inverted peak shape (a valley shape) so as to reduce (compensate for) inclinations of the scanning lines (depicted by the solid lines) formed on the surface of the photosensitive member.

FIG. 33 is a plan view symbolically illustrating adjusting means for adjusting inclinations of main scanning lines.

Means for generating inclinations of scanning lines in the optical scanning device can be realized by arranging that each of the second scanning lenses powered in a sub-scanning direction be inclined around an optical axis, as shown in FIG. 33. Each of these second scanning lenses may be inclined initially. Alternatively, an adjusting screw 501 and a spring 502 may be used so as to adjust the inclination of each of the second scanning lenses, as shown in FIG. 33. Thereby, errors in forming components and errors in mounting the components can be compensated so as to enable a scanning with a higher accuracy.

Still alternatively, each of the scanning optical systems as a whole may be inclined around the optical axis so as to adjust inclinations of main scanning lines.

Next, a description will be given of a fourteenth embodiment of the present invention.

Figure 34:
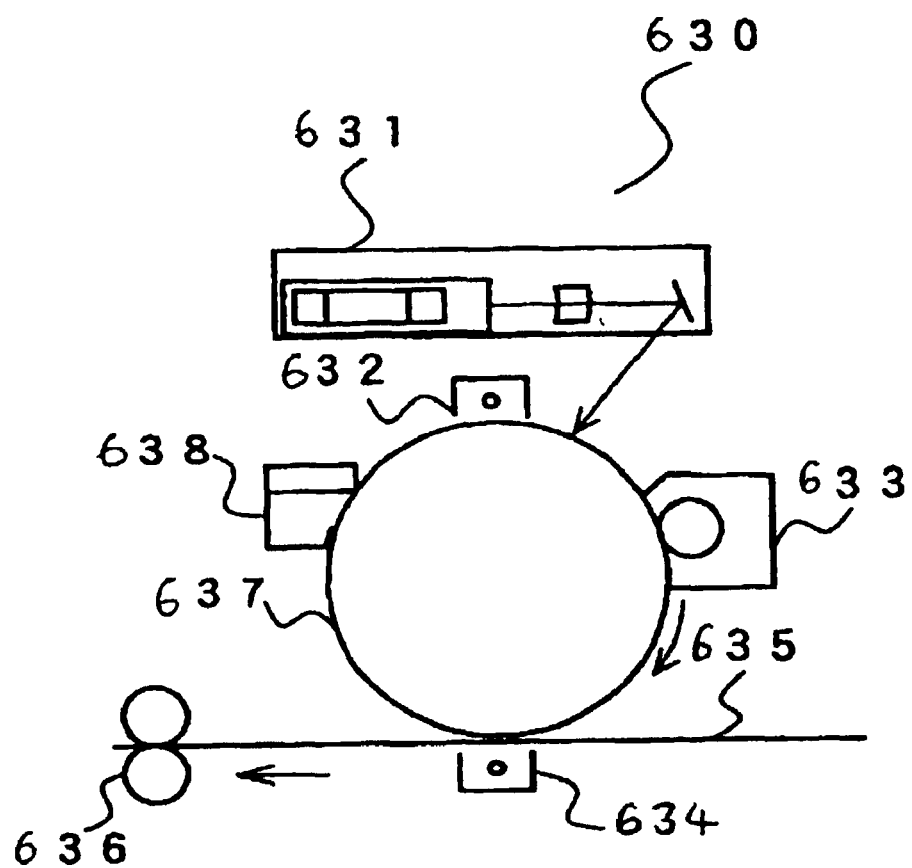
FIG. 34 is a diagram symbolically illustrating an image forming apparatus using the optical scanning device according to the present invention.

FIG. 34 is a diagram symbolically illustrating an image forming apparatus 630 using the optical scanning device according to the present invention.

The image forming apparatus 630, using an optical scanning device 631 according to the present invention, forms an image by performing general steps of charging, exposing, developing, transferring, fixing and cleaning. In the charging step, a surface of a photosensitive member 637 is charged by a charger 632. The exposing step is performed by the optical scanning device 631 so as to form an electrostatic latent image on the surface of the photosensitive member 637. In the developing steps, the electrostatic latent image formed on the surface of the photosensitive member 637 is developed into a toner image by a developing device 633. In the transferring step, the toner image developed on the photosensitive member 637 is transferred to a sheet 635 by a transfer charger 634. In the fixing step, the toner image on the sheet 635 is fixed by a fixing device 636. In the cleaning step, the surface of the photosensitive member 637 is cleaned by a cleaning device 638.

The present invention is not limited to the specifically disclosed embodiments, and variations and modifications may be made without departing from the scope of the present invention.

The present application is based on Japanese priority applications No. 2001-279420 filed on Sep. 14, 2001, No. 2001-293179 filed on Sep. 26, 2001, and No. 2001-327317 filed on Oct. 25, 2001, the entire contents of which are hereby incorporated by reference.

What is claimed is:

1. An optical scanning device comprising:
   a plurality of scanning optical systems including a plurality of respective deflecting units each performing an optical scanning by oscillation;
   wherein said deflecting units have substantially equal scanning frequencies by adjusting respective resonance frequencies so that the scanning frequency of each of said deflecting units is set midway between a maximum value and a minimum value of a resonance frequency intrinsic to the deflecting unit.

2. An optical scanning device comprising:
   a light source emitting a light;
   an optical scanner including a frame substrate, a stationary member, and a mirror supported by a mirror substrate via an elastic member so as to deflect said light emitted from said light source by oscillating said minor back and forth on a twisting axis formed by said elastic member;

resonance-frequency adjusting means for adjusting an intrinsic resonance frequency determined by said mirror and said elastic member forming said twisting axis by changing a moment of inertia of said mirror; and frequency varying means;

wherein said mirror includes a moving electrode on a side surface thereof, said stationary member opposing said moving electrode includes a stationary electrode, and said frequency varying means varies a frequency of a voltage impressed to said moving electrode and said stationary electrode, according to said resonance frequency adjusted by said resonance-frequency adjusting means.

3. An optical scanning device comprising:

a light source emitting a light;

an optical scanner including a frame substrate, a stationary member, and a mirror supported by a mirror substrate via an elastic member so as to deflect said light emitted from said light source by oscillating said mirror back and forth on a twisting axis formed by said elastic member;

resonance-frequency adjusting means for adjusting an intrinsic resonance frequency determined by said mirror and said elastic member forming said twisting axis by changing a moment of inertia of said mirror;

frequency varying means; and voltage adjusting means for adjusting a voltage impressed to a moving electrode and a stationary electrode, wherein said mirror includes said moving electrode on a side surface thereof, said stationary member opposing said moving electrode includes said stationary electrode, and said frequency varying means varies a frequency of said voltage impressed to said moving electrode and said stationary electrode, according to said resonance frequency adjusted by said resonance-frequency adjusting means.

4. An optical scanning device comprising:

a light source emitting a light;

an optical scanner including a first substrate and a second substrate both composed of silicon, an insulating layer provided between said first substrate and said second substrate, and a mirror supported by said first substrate via an elastic member so as to deflect said light emitted from said light source by oscillating said mirror back and forth on a twisting axis formed by said elastic member;

a moving electrode provided on a side surface of said mirror;

a stationary electrode provided on said first substrate opposing said moving electrode;

a separation groove provided in said first substrate so as to electrically separate said stationary electrode and said moving electrode;

resonance-frequency adjusting means for adjusting an intrinsic resonance frequency determined by said mirror and said elastic member forming said twisting axis;

frequency varying means for varying a frequency of a voltage impressed to said moving electrode and said stationary electrode, according to said resonance frequency adjusted by said resonance-frequency adjusting means; and voltage adjusting means for adjusting said voltage impressed to said moving electrode and said stationary electrode.

5. The optical scanning device as claimed in claim 4, comprising a plurality of the optical scanners, wherein said resonance-frequency adjusting means adjusts the resonance frequencies of the respective mirrors included in said optical scanners so as to coincide with the largest resonance frequency among said resonance frequencies.

6. An optical scanning device comprising:

a light source emitting a light;

an optical scanner including a frame substrate, a stationary member, and a mirror supported by a mirror substrate via an elastic member so as to deflect said light emitted from said light source by oscillating said mirror back and forth on a twisting axis formed by said elastic member;

resonance-frequency adjusting means for adjusting an intrinsic resonance frequency determined by said mirror and said elastic member forming said twisting axis by changing a moment of inertia of said mirror; and a plurality of optical scanners;

wherein said resonance-frequency adjusting means adjusts the resonance frequencies of the respective mirrors included in said optical scanners so as to coincide with the largest resonance frequency among said resonance frequencies.

7. An optical scanning device comprising:

more than two scanning optical systems including respective light sources emitting respective light beams controlled according to image data, and respective deflecting units deflecting the emitted respective light beams; and an image bearer on which the deflected light beams are projected so that images are formed by the projected light beams scanning on said image bearer, wherein said scanning optical systems are arranged serially in a main scanning direction of said image bearer, at least one pair of the adjacent scanning optical systems among said scanning optical systems cause said projected light beams to scan on said image bearer in opposite main scanning directions parting from a joint of the respective images formed on said image bearer, no pair of the adjacent scanning optical systems among said scanning optical systems cause said projected light beams to scan on said image bearer in opposite main scanning directions both toward the joint of the respective images formed on said image bearer, and main scanning lines drawn by said adjacent scanning optical systems having inclinations different from each other.

8. The optical scanning device as claimed in claim 7, wherein at least one of said scanning optical systems includes adjusting means for adjusting an inclination of a main scanning line drawn by said adjacent scanning optical system.

9. An optical scanning device comprising:

a plurality of scanning optical systems including respective light sources emitting respective light beams controlled according to image data, and respective deflecting units deflecting the emitted respective light beams; and an image bearer on which the deflected light beams are projected so that images are formed by the projected light beams scanning on said image bearer, wherein said scanning optical systems are arranged serially in a main scanning direction of said image bearer, at least one pair of the adjacent scanning optical systems among said scanning optical systems cause said projected light beams to scan on said image bearer in opposite main scanning directions parting from a joint of the respective images formed on said image bearer, main scanning lines drawn by said adjacent scanning optical systems have inclinations different from each other, at least one of said scanning optical systems includes adjusting means for adjusting the inclination of the main scanning line drawn by said adjacent scanning optical system.

10. An image forming apparatus comprising:

an optical scanning device comprising:
   a light source emitting a light;
   an optical scanner including a first substrate and a second substrate both composed of silicon;
   an insulating layer provided between said first substrate and said second substrate;
   a mirror supported by said first substrate via an elastic member so as to deflect said light emitted from said light source by oscillating said mirror back and forth on a twisting axis formed by said elastic member;
   a moving electrode provided on a side surface of said mirror;
   a stationary electrode provided on said first substrate opposing said moving electrode;
   a separation groove provided in said first substrate so as to electrically separate said stationary electrode and said moving electrode;
   resonance-frequency adjusting means for adjusting an intrinsic resonance frequency determined by said mirror and said elastic member forming said twisting axis;
   frequency varying means for varying a frequency of a voltage impressed to said moving electrode and said stationary electrode, according to said resonance frequency adjusted by said resonance-frequency adjusting means;
   voltage adjusting means for adjusting said voltage impressed to said moving electrode and said stationary electrode;

a photosensitive member on which an electrostatic latent image is formed by said optical scanning device;

a developing unit developing said electrostatic latent image with a toner into a toner image; and a transferring unit transferring said toner image to a sheet.

11. An image forming apparatus comprising:

an optical scanning device comprising:
   more than two scanning optical systems including respective light sources emitting respective light beams controlled according to image data;
   respective deflecting units deflecting the emitted respective light beams;
   and an image bearer on which the deflected light beams are projected so that images are formed by the projected light beams scanning on said image bearer, wherein said scanning optical systems are arranged serially in a main scanning direction of said image bearer, at least one pair of the adjacent scanning optical systems among said scanning optical systems cause said projected light beams to scan on said image bearer in opposite main scanning directions parting from a joint of the respective images formed on said image bearer, no pair of the adjacent scanning optical systems among said scanning optical systems cause said projected light beams to scan on said image bearer in opposite main scanning directions both toward the joint of the respective images formed on said image bearer, and main scanning lines drawn by said adjacent scanning optical systems having inclinations different from each other.

12. An image forming apparatus comprising:

an optical scanning device comprising:
   a plurality of scanning optical systems including respective light sources emitting respective light beams controlled according to image data;
   respective deflecting units deflecting the emitted respective light beams; and
   an image bearer on which the deflected light beams are projected so that images are formed by the projected light beams scanning on said image bearer, wherein said scanning optical systems are arranged serially in a main scanning direction of said image bearer, at least one pair of the adjacent scanning optical systems among said scanning optical systems cause said projected light beams to scan on said image bearer in opposite main scanning directions parting from a joint of the respective images formed on said image bearer, and main scanning lines drawn by said adjacent scanning optical systems have inclinations different from each other.

* * * * *